(12) United States Patent
Kalliola et al.

(10) Patent No.: US 9,432,966 B2
(45) Date of Patent: Aug. 30, 2016

(54) METHOD, APPARATUS, AND COMPUTER PROGRAM PRODUCT FOR SECURE DISTANCE BOUNDING BASED ON DIRECTION MEASUREMENT

(75) Inventors: Kimmo Juhana Kalliola, Espoo (FI); Ville Valtteri Ranki, Jorvas (FI); Antti Paavo Tapani Kainulainen, Nummela (FI); Fabio Bellon, Espoo (FI)

(73) Assignee: Nokia Technologies Oy, Espoo (FI)

( * ) Notice: Subject to any disclaimer, the term of this patent is extended or adjusted under 35 U.S.C. 154(b) by 79 days.

(21) Appl. No.: 14/362,396

(22) PCT Filed: Dec. 8, 2011

(86) PCT No.: PCT/IB2011/055556
§ 371 (c)(1),
(2), (4) Date: Aug. 5, 2014

(87) PCT Pub. No.: WO2013/084030
PCT Pub. Date: Jun. 13, 2013

(65) Prior Publication Data
US 2015/0189619 A1    Jul. 2, 2015

(51) Int. Cl.
H04W 4/02 (2009.01)
H04W 64/00 (2009.01)
H04W 4/00 (2009.01)
G01S 1/02 (2010.01)
G01S 3/14 (2006.01)
G01S 11/04 (2006.01)
(Continued)

(52) U.S. Cl.
CPC .............. *H04W 64/006* (2013.01); *G01S 1/02* (2013.01); *G01S 3/14* (2013.01); *G01S 11/04* (2013.01); *H04W 4/008* (2013.01); *H04W 4/02* (2013.01); *H04W 4/023* (2013.01); *H04W 12/08* (2013.01); *H04W 64/00* (2013.01); *H04W 12/12* (2013.01)

(58) Field of Classification Search
None
See application file for complete search history.

(56) References Cited

U.S. PATENT DOCUMENTS

| | | |
|---|---|---|
| 2003/0202468 A1 | 10/2003 | Cain et al. |
| 2006/0052112 A1 | 3/2006 | Baussi et al. |
| 2007/0197229 A1* | 8/2007 | Kalliola ............... G01S 3/46 455/456.1 |

(Continued)

FOREIGN PATENT DOCUMENTS

WO    2011131745    10/2011

OTHER PUBLICATIONS

Extended European Search Report received for corresponding European Patent Application No. 11876899.3, dated Jun. 8, 2015, 8 pages.

(Continued)

*Primary Examiner* — King Poon
*Assistant Examiner* — Vincent Peren
(74) *Attorney, Agent, or Firm* — Locke Lord LLP

(57) ABSTRACT

Method, apparatus, and computer program product example embodiments provide secure distance estimation based on direction measurement. According to an example embodiment of the invention, a method comprises receiving, by an apparatus (102) from a remote device (100), one or more wireless packets including information packets containing angle of departure information (160) of the remote device (100); determining in the apparatus (102), a first angle of departure and a second angle of departure from the received angle of departure information; and generating distance estimation data in the apparatus relative to the remote device (100), based on the determined first angle of departure and second angle of departure.

22 Claims, 37 Drawing Sheets

(51) Int. Cl.
*H04W 12/08* (2009.01)
*H04W 12/12* (2009.01)

(56) References Cited

U.S. PATENT DOCUMENTS

| | | |
|---|---|---|
| 2007/0247367 A1 | 10/2007 | Anjum et al. |
| 2008/0100502 A1* | 5/2008 | Jantunen .................. G01S 3/74 342/146 |
| 2008/0182592 A1 | 7/2008 | Cha et al. |
| 2008/0204322 A1* | 8/2008 | Oswald .................... G01S 5/04 342/465 |
| 2008/0297401 A1 | 12/2008 | Nishida |
| 2010/0075603 A1 | 3/2010 | Newton et al. |
| 2010/0302102 A1 | 12/2010 | Desai et al. |
| 2011/0223940 A1 | 9/2011 | Zhong et al. |
| 2011/0319020 A1 | 12/2011 | Desai et al. |

OTHER PUBLICATIONS

Wei et al., "AOD/AOA/TOA-Based 3D Positioning in NLOS Multipath Environments", IEEE 22nd International Symposium on Personal Indoor and Movile Radio Communications, Sep. 11-14, 2011, pp. 1289-1293.

Kemppi et al., "Hybrid Positioning System Combining Angle-Based Localization, Pedestrian Dead Reckoning and Map Filtering", International Conference on Indoor Positioning and Indoor Navigation, Sep. 15-17, 2010, 7 pages.

Gierlich et al., "A Reconfigurable MIMO System for High-Precision FMCW Local Positioning", IEEE Transactions on Microwave Theory and Techniques, vol. 59, No. 12, Dec. 2011, pp. 3228-3238.

International Search Report and Written Opinion received for corresponding Patent Cooperation Treaty Application No. PCT/IB2011/055556, dated Sep. 21, 2012, 13 pages.

Vora A. et al. "Secure Location Verification Using Radio Broadcast", IEEE Transactions on Dependable and Secure Computing 2006, vol. 3, Issue 4, pp. 377-385.

Singelee D. et al. "Location Verification using Secure Distance Bounding Protocols", International Conference on Mobile Adhoc and Sensor Systems, Washington DC, Nov. 2005.

Ferreres A. et al. "Guaranteeing the Authenticity of Location Information", IEEE Pervasive Computing 2008, vol. 7, Issue 3, pp. 72-80.

"SPOT: Secure Positioning (Localization)", ETH Zurich, System Security Group, Retrieved on Oct. 13, 2014, Webpage available at : http://www.syssec.ethz.ch/research/spot.

* cited by examiner

ANGLE OF DEPARTURE (AoD) ESTIMATION

ANGLE OF DEPARTURE (AoD) ESTIMATION

ANGLE OF DEPARTURE (AoD) ESTIMATION

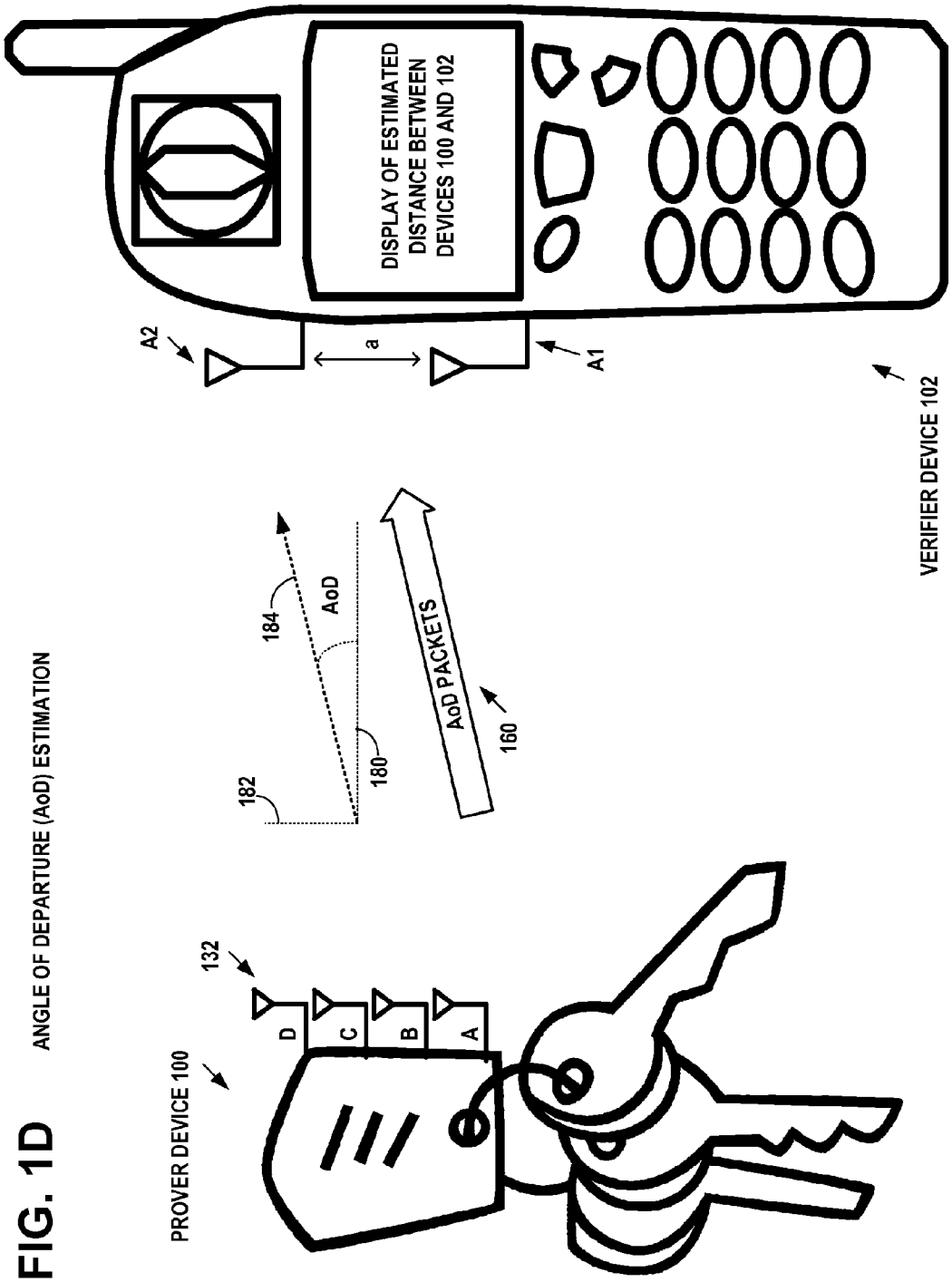
FIG. 1D   ANGLE OF DEPARTURE (AoD) ESTIMATION

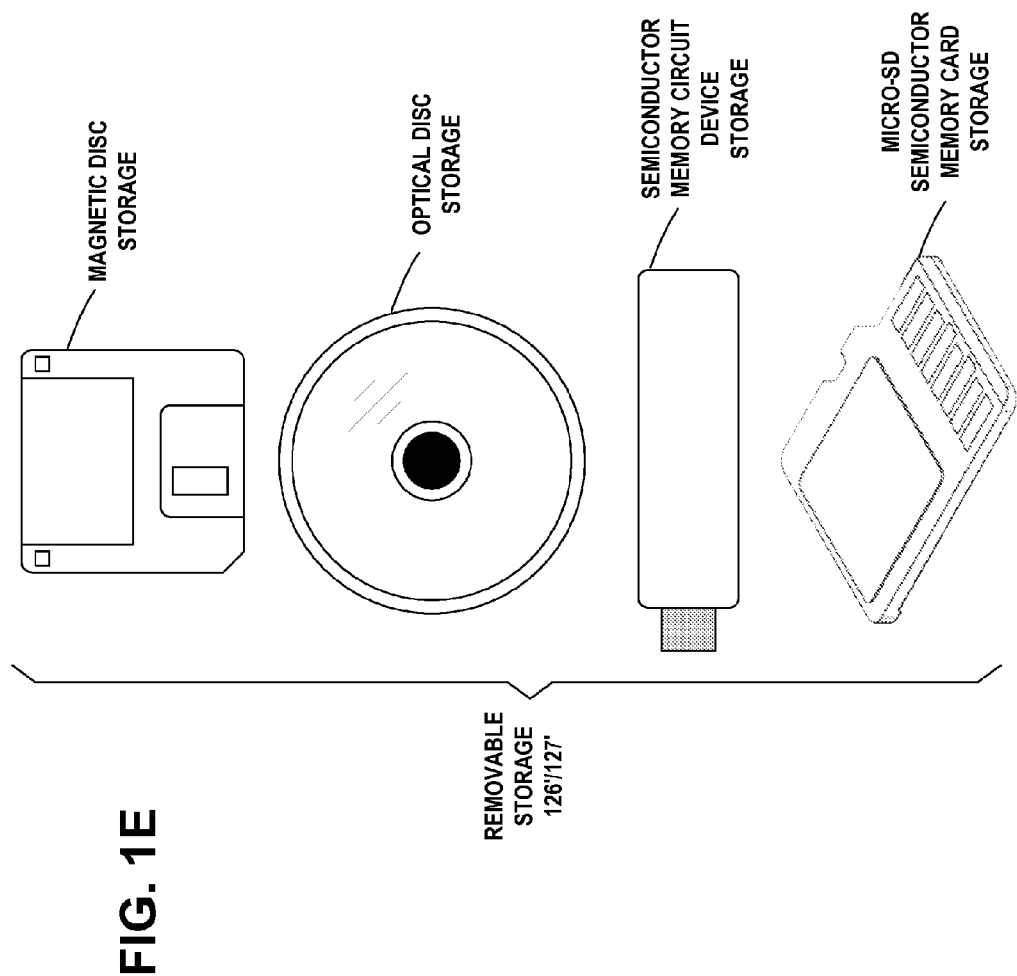

ANGLE OF DEPARTURE (AoD) ESTIMATION

ANGLE OF DEPARTURE (AoD) ESTIMATION

ANGLE OF DEPARTURE (AoD) ESTIMATION

ANGLE OF DEPARTURE (AoD) ESTIMATION

ANGLE OF DEPARTURE (AoD) ESTIMATION

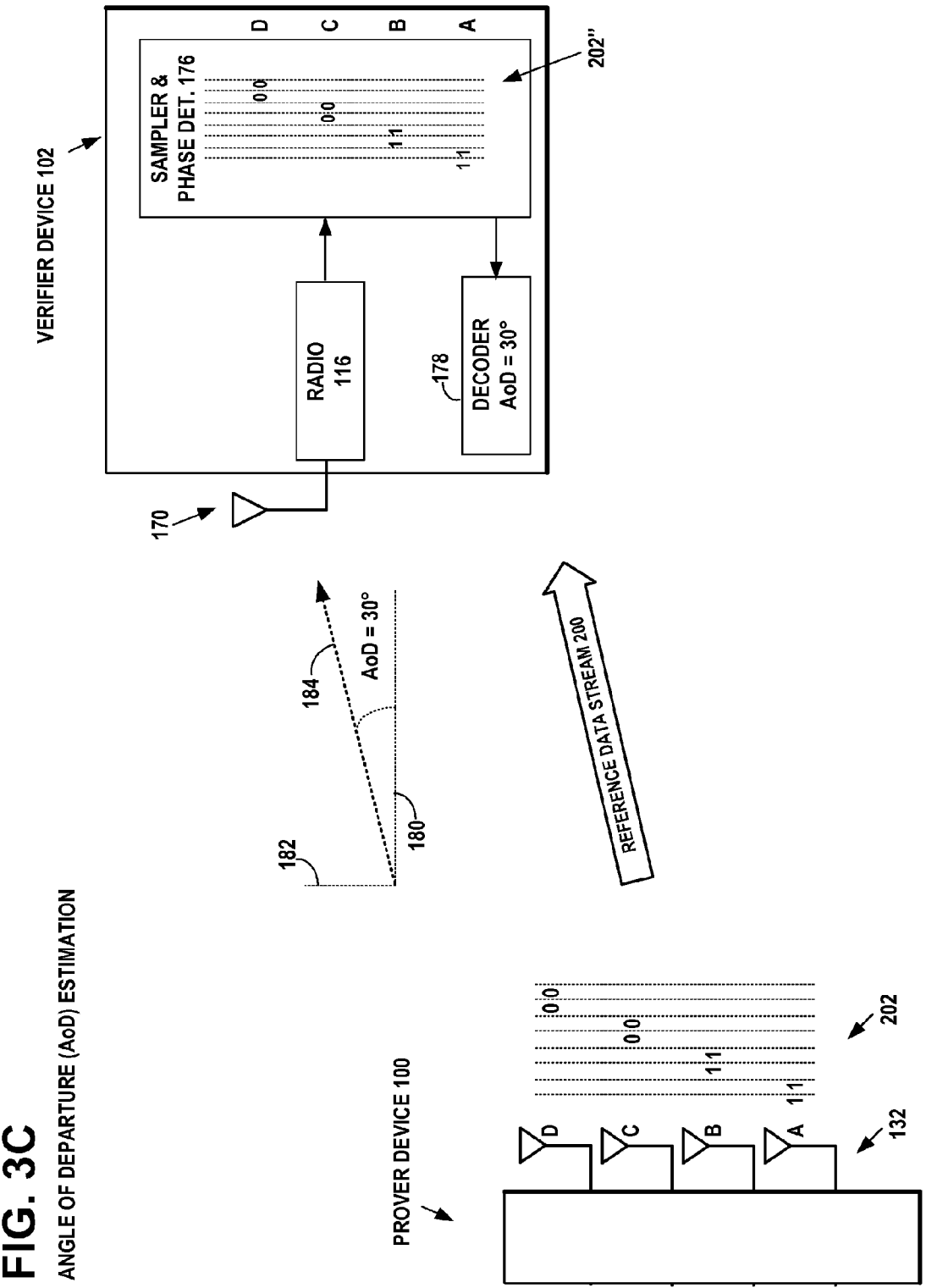

FIG. 4
ANGLE OF DEPARTURE (AoD) ESTIMATION

PROCESS IN VERIFIER DEVICE 102

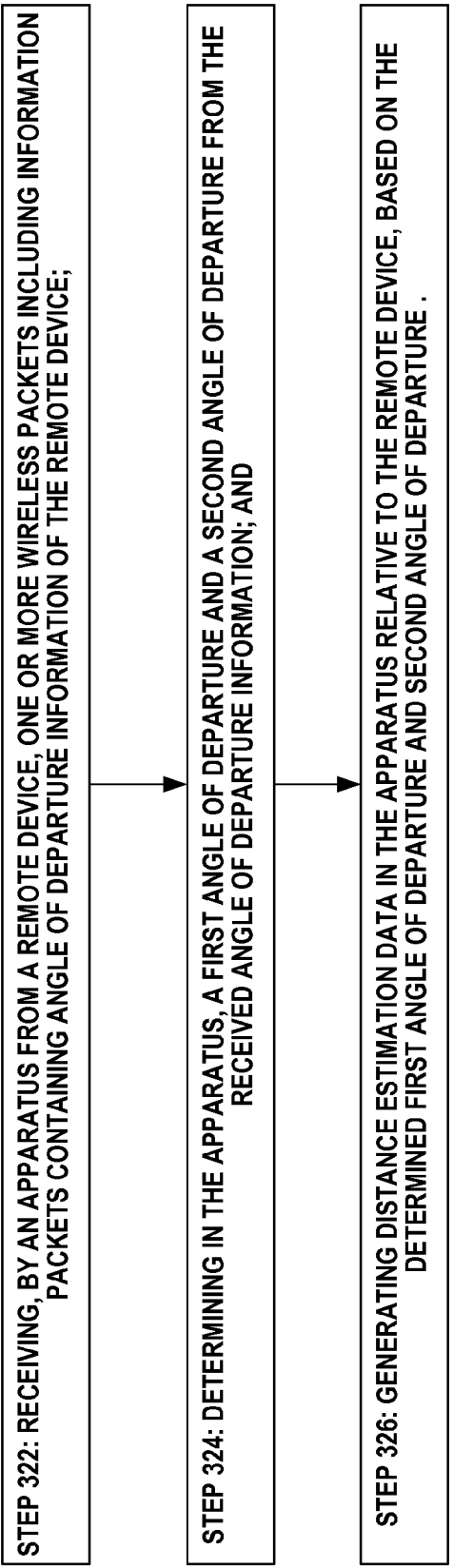

320

STEP 322: RECEIVING, BY AN APPARATUS FROM A REMOTE DEVICE, ONE OR MORE WIRELESS PACKETS INCLUDING INFORMATION PACKETS CONTAINING ANGLE OF DEPARTURE INFORMATION OF THE REMOTE DEVICE;

STEP 324: DETERMINING IN THE APPARATUS, A FIRST ANGLE OF DEPARTURE AND A SECOND ANGLE OF DEPARTURE FROM THE RECEIVED ANGLE OF DEPARTURE INFORMATION; AND

STEP 326: GENERATING DISTANCE ESTIMATION DATA IN THE APPARATUS RELATIVE TO THE REMOTE DEVICE, BASED ON THE DETERMINED FIRST ANGLE OF DEPARTURE AND SECOND ANGLE OF DEPARTURE.

ANGLE OF ARRIVAL (AoA) ESTIMATION

ANGLE OF ARRIVAL (AoA) ESTIMATION

ANGLE OF ARRIVAL (AoA) ESTIMATION

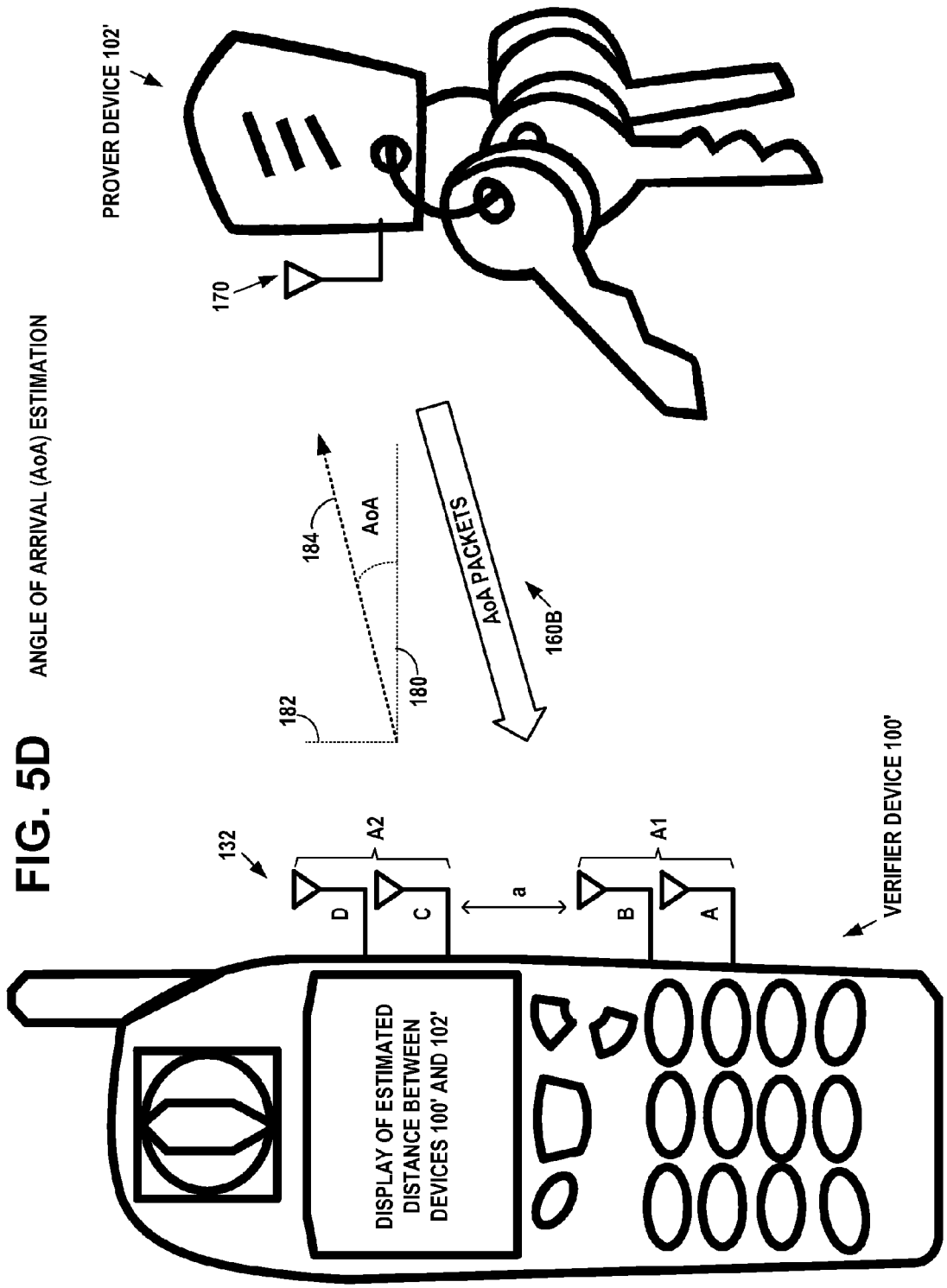

ANGLE OF ARRIVAL (AoA) ESTIMATION

ANGLE OF ARRIVAL (AoA) ESTIMATION

ANGLE OF ARRIVAL (AoA) ESTIMATION

ANGLE OF ARRIVAL (AoA) ESTIMATION

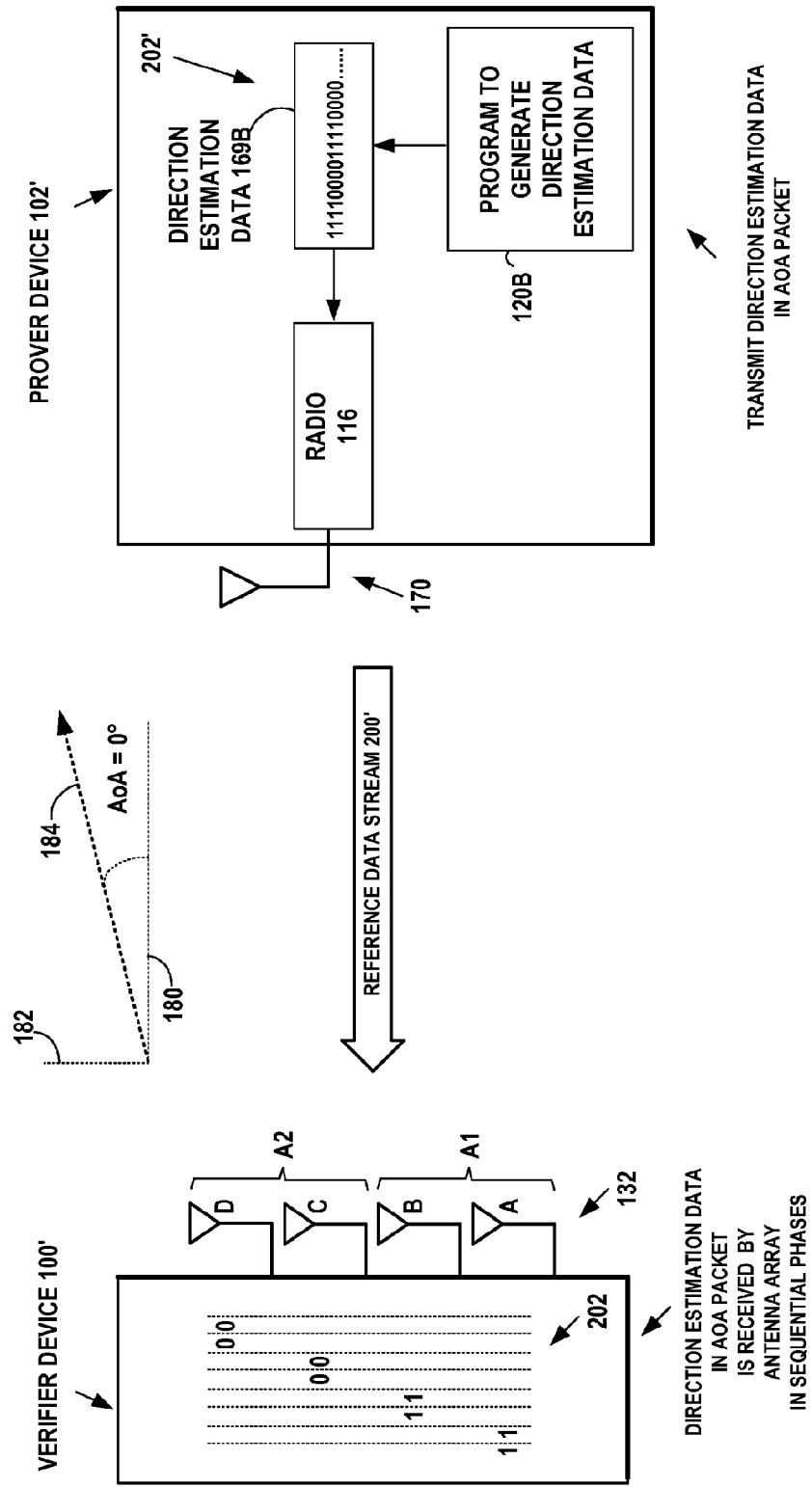

ANGLE OF ARRIVAL (AoA) ESTIMATION

FIG. 8
ANGLE OF ARRIVAL (AoA) ESTIMATION

PROCESS IN VERIFIER DEVICE 100'

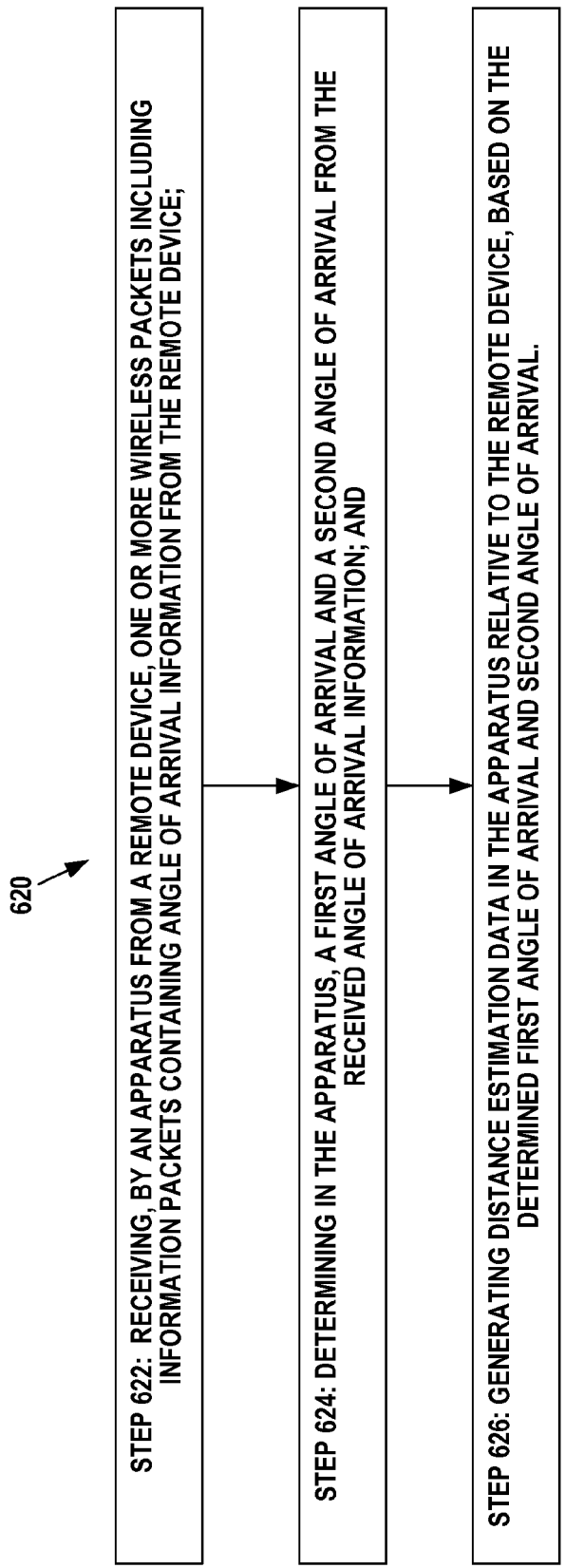

STEP 622: RECEIVING, BY AN APPARATUS FROM A REMOTE DEVICE, ONE OR MORE WIRELESS PACKETS INCLUDING INFORMATION PACKETS CONTAINING ANGLE OF ARRIVAL INFORMATION FROM THE REMOTE DEVICE;

STEP 624: DETERMINING IN THE APPARATUS, A FIRST ANGLE OF ARRIVAL AND A SECOND ANGLE OF ARRIVAL FROM THE RECEIVED ANGLE OF ARRIVAL INFORMATION; AND

STEP 626: GENERATING DISTANCE ESTIMATION DATA IN THE APPARATUS RELATIVE TO THE REMOTE DEVICE, BASED ON THE DETERMINED FIRST ANGLE OF ARRIVAL AND SECOND ANGLE OF ARRIVAL.

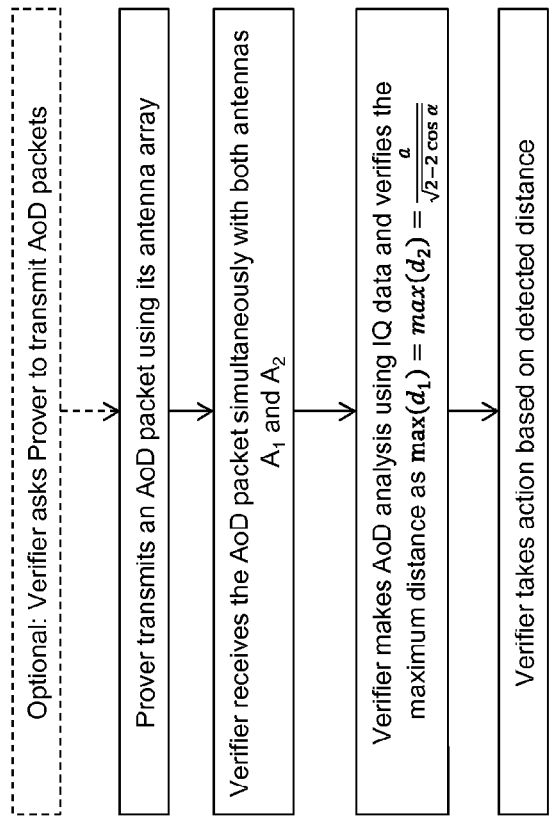
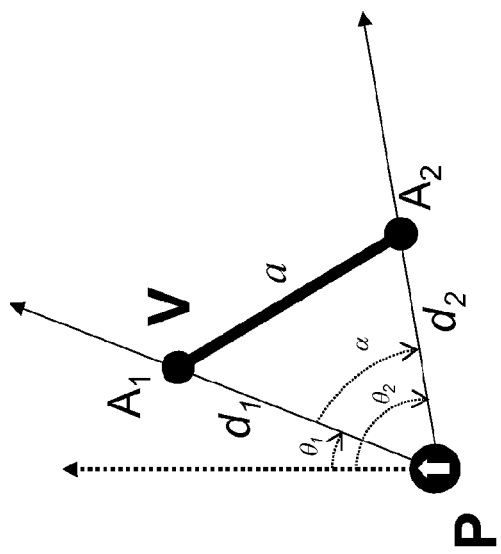
FIG. 11A

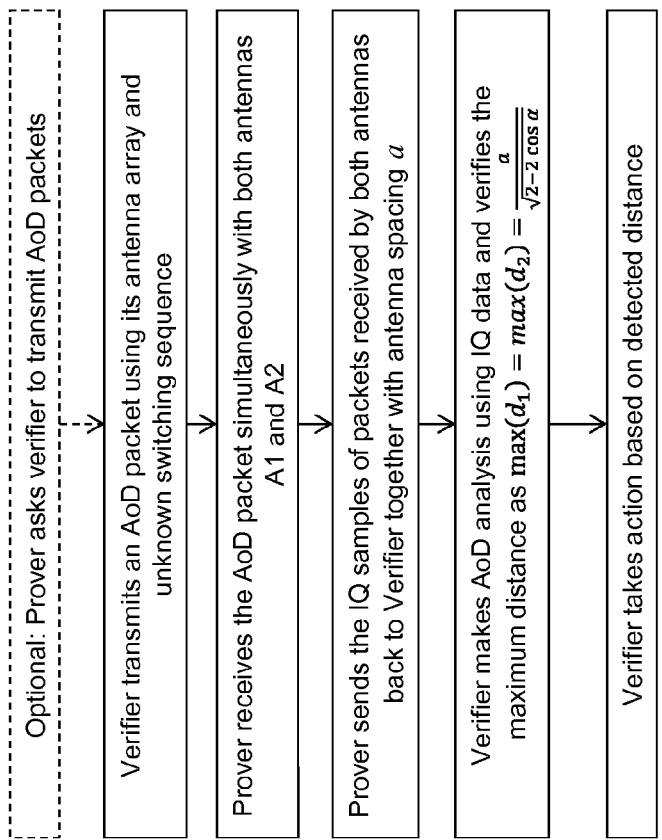
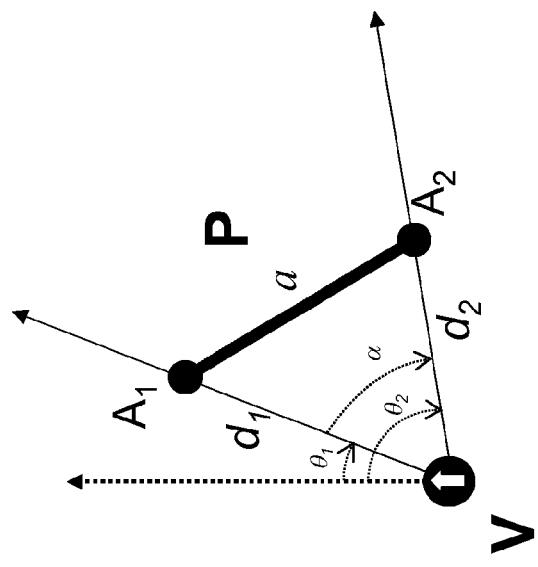
FIG. 11B

FIG. 13A
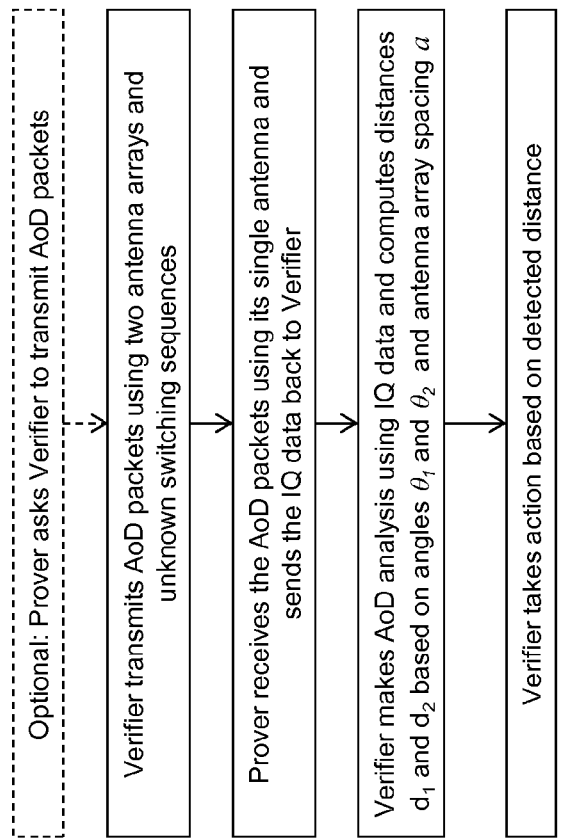
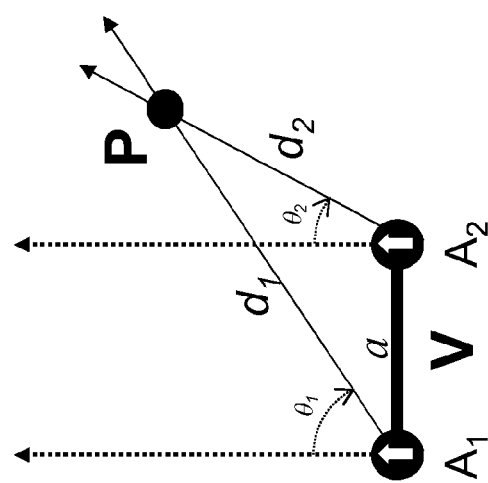

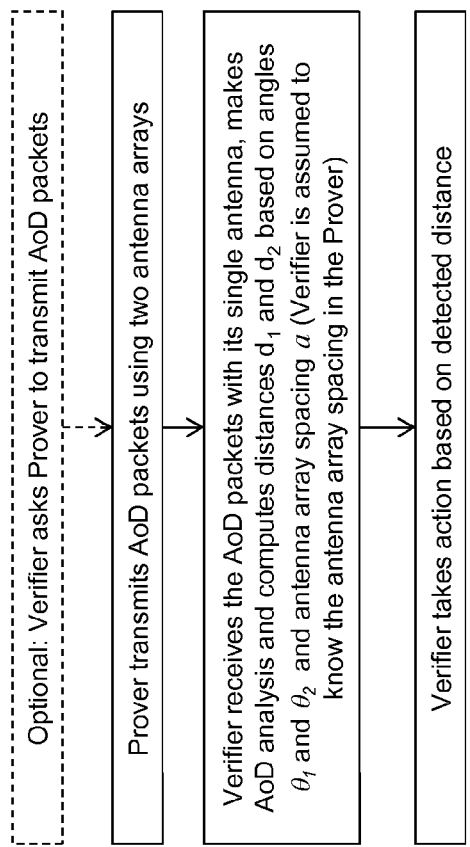
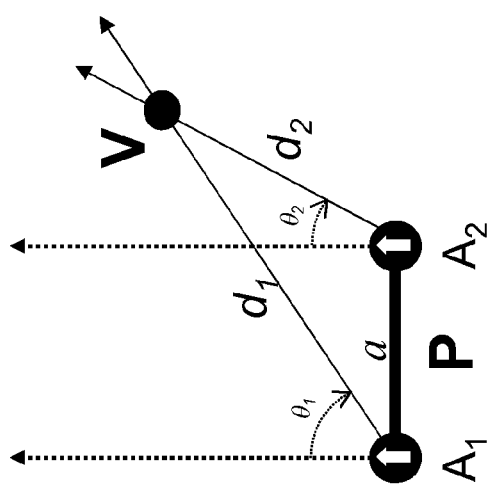
FIG. 13B

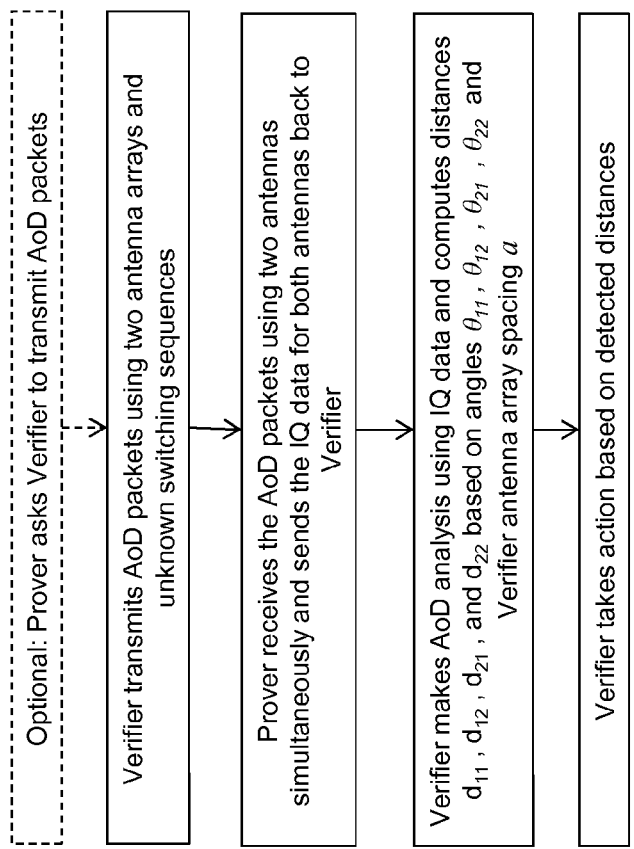
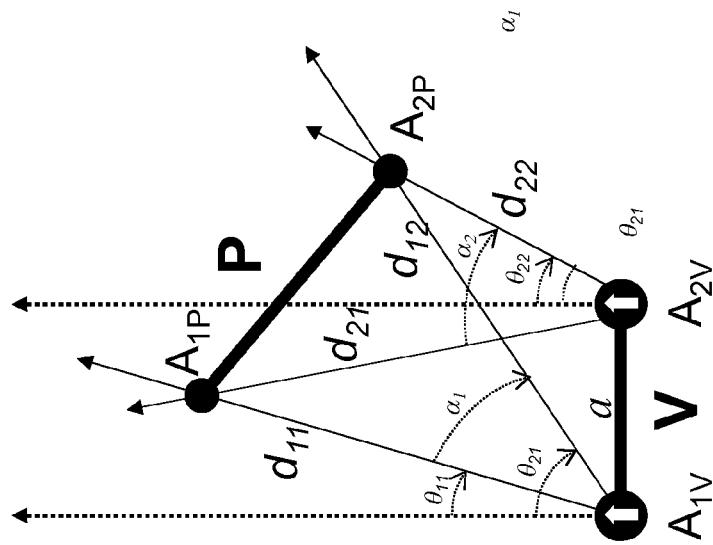
FIG. 15A

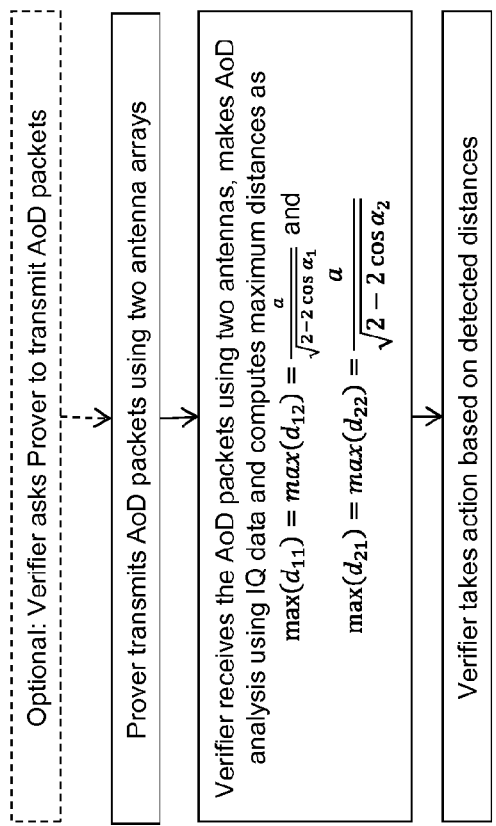
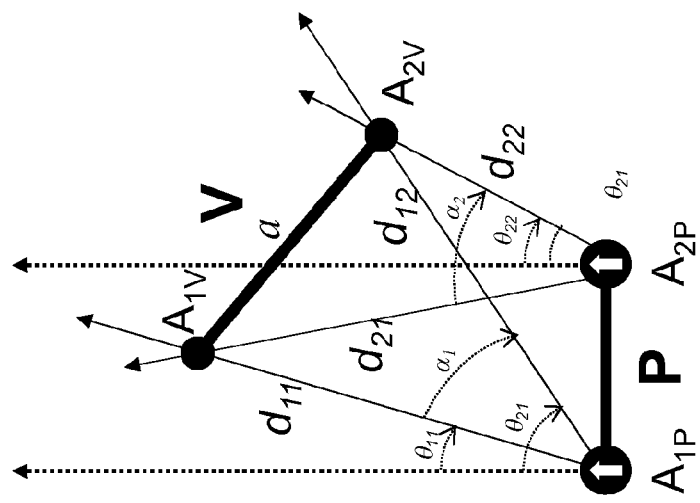
FIG. 15B

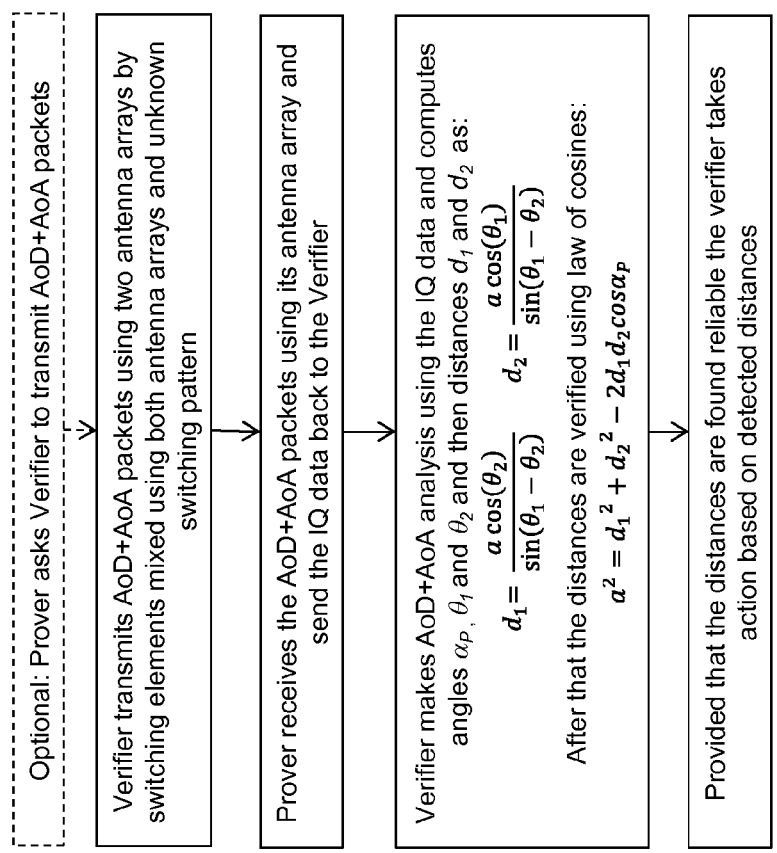
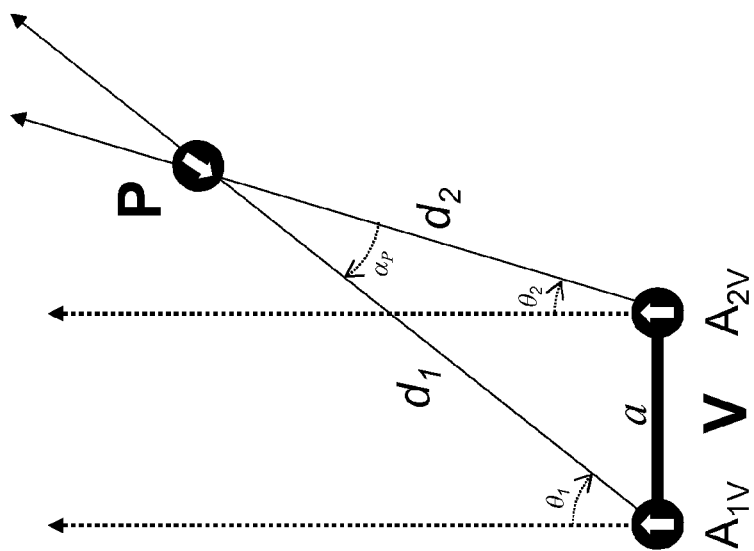
FIG. 16

METHOD, APPARATUS, AND COMPUTER PROGRAM PRODUCT FOR SECURE DISTANCE BOUNDING BASED ON DIRECTION MEASUREMENT

RELATED APPLICATION

This application was originally filed as PCT Application No. PCT/IB2011/055556 filed Dec. 8, 2011.

FIELD

The field of the invention relates to wireless shirt-range communication and more particularly to secure distance finding.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970 s to early 1980 s with first generation (1 G) analog cellular telephones that provided baseline voice communications, to modern digital cellular telephones. GSM is an example of a widely employed 2 G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wideband (UWB), ZigBee (IEEE 802.15.4, IEEE 802.15.4 a), and ultra-high frequency radio frequency identification (UHF RFID) technologies. All of these wireless communication technologies have features and advantages that make them appropriate for various applications.

Wireless security has become an important aspect of the overall security for systems as large as computer networks and as small as keyless door locks. Wireless devices such as mobile laptops and fixed access points may be vulnerable to attack by remotely located, high-power transmitters or directive antennas that increase the received signal level beyond a minimum distance from the receiver. Security attacks may be attempted by remotely located transmitters using advanced predictive algorithms that allow shorter processing times and therefore longer propagation delays for the response signals. Wireless proximity detection for actuating a door lock is used in automobiles and office buildings equipped with wireless receivers that unlock the door when a valid key fob with a wireless transmitter is brought within range.

Proving the proximity of a wireless device may be an important consideration in granting it access to a wireless system. In secure distance estimation or bounding, a wireless prover device attempts to prove its distance from a wireless verifier device and the verifier device attempts to verify the location of the prover device.

Conventional methods for secure distance estimation or bounding in wireless systems are based on two principles: 1) received signal strength (RSS) based proximity detection and 2) round-trip-time (RTT) based proximity detection.

In RSS-based methods, the proximity is detected by assuming a certain threshold for the received signal strength that is assumed to only be exceeded if the radio frequency transmitter (the prover) is closer to the receiver (the verifier) than a maximum allowed distance. In RTT-based methods, the proximity is detected by measuring the time required for a prover device to respond to a wake-up signal transmitted by a verifier device. If a predetermined maximum time is exceeded, the prover device is assumed to be too far from the receiver.

RSS-based security methods may be vulnerable to attack by remotely located, high-power transmitters or directive antennas that increase the received signal level beyond a minimum distance from the receiver. The RTT-based security methods may be vulnerable to attack by remotely located transmitters using advanced predictive algorithms that allow shorter processing times and therefore longer propagation delays for the response signals.

SUMMARY

Method, apparatus, and computer program product example embodiments provide secure distance estimation based on direction measurement.

In an example embodiment of the invention, a method comprises:

receiving, by an apparatus from a remote device, one or more wireless packets including information packets containing angle of departure information of the remote device;

determining in the apparatus, a first angle of departure and a second angle of departure from the received angle of departure information; and generating distance estimation data in the apparatus relative to the remote device, based on the determined first angle of departure and second angle of departure.

In an example embodiment of the invention, the method further comprises:

determining the first angle of departure using a first antenna of the apparatus receiving the information packets and determining the second angle of departure using a second antenna of the apparatus receiving the information packets, the first antenna being spatially separate from the second antenna.

In an example embodiment of the invention, the method further comprises:

determining the first angle of departure when the apparatus receives the information packets at a first location and determining the second angle of departure when the apparatus receives the information packets at a second location, the first location being spatially separate from the second location.

In an example embodiment of the invention, the method further comprises:

determining the first angle of departure when the apparatus receives the information packets at a first location and determining the second angle of departure when the apparatus receives the information packets at a second location, the first location being spatially separate from the second location by a separation distance that is measured with an acceleration sensor.

In an example embodiment of the invention, the method further comprises:

calculating the distance estimation data based on a difference between the first angle of departure and second angle of departure.

In an example embodiment of the invention, an apparatus comprises:

at least one processor;

at least one memory including computer program code;

the at least one memory and the computer program code configured to, with the at least one processor, cause the apparatus at least to:

receive from a remote device, one or more wireless packets including information packets containing angle of departure information of the remote device;

determine a first angle of departure and a second angle of departure from the received angle of departure information; and generate distance estimation data relative to the remote device, based on the determined first angle of departure and second angle of departure.

In an example embodiment of the invention, the apparatus further comprises:

the at least one memory and the computer program code configured to, with the at least one processor, cause the apparatus at least to:

determine the first angle of departure using a first antenna of the apparatus receiving the information packets and determine the second angle of departure using a second antenna of the apparatus receiving the information packets, the first antenna being spatially separate from the second antenna.

In an example embodiment of the invention, the apparatus further comprises:

the at least one memory and the computer program code configured to, with the at least one processor, cause the apparatus at least to:

determine the first angle of departure when the apparatus receives the information packets at a first location and determine the second angle of departure when the apparatus receives the information packets at a second location, the first location being spatially separate from the second location.

In an example embodiment of the invention, the apparatus further comprises:

the at least one memory and the computer program code configured to, with the at least one processor, cause the apparatus at least to:

determine the first angle of departure when the apparatus receives the information packets at a first location and determine the second angle of departure when the apparatus receives the information packets at a second location, the first location being spatially separate from the second location by a separation distance that is measured with an acceleration sensor.

In an example embodiment of the invention, the apparatus further comprises:

the at least one memory and the computer program code configured to, with the at least one processor, cause the apparatus at least to:

calculate the distance estimation data based on a difference between the first angle of departure and second angle of departure.

In an example embodiment of the invention, a computer program product comprising computer executable program code recorded on a computer readable non-transitory storage medium, the computer executable program code comprises:

code for receiving, by an apparatus from a remote device, one or more wireless packets including information packets containing angle of departure information of the remote device;

code for determining in the apparatus, a first angle of departure and a second angle of departure from the received angle of departure information; and code for generating distance estimation data in the apparatus relative to the remote device, based on the determined first angle of departure and second angle of departure.

In an example embodiment of the invention, a method comprises:

receiving, by an apparatus from a remote device, one or more wireless packets including information packets containing angle of arrival information from the remote device;

determining in the apparatus, a first angle of arrival and a second angle of arrival from the received angle of arrival information; and generating distance estimation data in the apparatus relative to the remote device, based on the determined first angle of arrival and second angle of arrival.

In an example embodiment of the invention, the method further comprises:

determining the first angle of arrival using a first antenna array of the apparatus receiving the information packets and determining the second angle of arrival using a second antenna array of the apparatus receiving the information packets, the first antenna array being spatially separate from the second antenna array.

In an example embodiment of the invention, the method further comprises:

determining the first angle of arrival when the apparatus receives the information packets in an antenna array of the apparatus when the apparatus is at a first location and determining the second angle of arrival when the apparatus receives the information packets in the antenna array when the apparatus is at a second location, the first location being spatially separate from the second location.

In an example embodiment of the invention, the method further comprises:

determining the first angle of arrival when the apparatus receives the information packets in an antenna array of the apparatus when the apparatus is at a first location and determining the second angle of arrival when the apparatus receives the information packets in the antenna array when the apparatus is at a second location, the first location being spatially separate from the second location, the first location being spatially separate from the second location by a separation distance that is measured with an acceleration sensor.

In an example embodiment of the invention, the method further comprises:

calculating the distance estimation data based on a difference between the first angle of arrival and second angle of arrival.

In an example embodiment of the invention, an apparatus comprises:

at least one processor;

at least one memory including computer program code;

the at least one memory and the computer program code configured to, with the at least one processor, cause the apparatus at least to:

receive from a remote device, one or more wireless packets including information packets containing angle of arrival information from the remote device;

determine a first angle of arrival and a second angle of arrival from the received angle of arrival information; and generate distance estimation data relative to the remote device, based on the determined first angle of arrival and second angle of arrival.

In an example embodiment of the invention, the apparatus further comprises:

determine the first angle of arrival using a first antenna array of the apparatus receiving the information packets and determine the second angle of arrival using a second antenna array of the apparatus receiving the information packets, the first antenna array being spatially separate from the second antenna array.

In an example embodiment of the invention, the apparatus further comprises:

determine the first angle of arrival when the apparatus receives the information packets in an antenna array of the apparatus when the apparatus is at a first location and determine the second angle of arrival when the apparatus receives the information packets in the antenna array when the apparatus is at a second location, the first location being spatially separate from the second location.

In an example embodiment of the invention, the apparatus further comprises:

determine the first angle of arrival when the apparatus receives the information packets in an antenna array of the apparatus when the apparatus is at a first location and determine the second angle of arrival when the apparatus receives the information packets in the antenna array when the apparatus is at a second location, the first location being spatially separate from the second location, the first location being spatially separate from the second location by a separation distance that is measured with an acceleration sensor.

In an example embodiment of the invention, the apparatus further comprises:

calculate the distance estimation data based on a difference between the first angle of arrival and second angle of arrival.

In an example embodiment of the invention, a computer program product comprising computer executable program code recorded on a computer readable non-transitory storage medium, the computer executable program code comprises:

code for receiving, by an apparatus from a remote device, one or more wireless packets including information packets containing angle of arrival information from the remote device;

code for determining in the apparatus, a first angle of arrival and a second angle of arrival from the received angle of arrival information; and code for generating distance estimation data in the apparatus relative to the remote device, based on the determined first angle of arrival and second angle of arrival.

The example embodiments of the invention provide secure distance estimation based on direction measurement.

DESCRIPTION OF THE FIGURES

FIG. 1D illustrates an example embodiment of the invention shown in FIGS. 1A, 1B, and 1C, wherein the prover device is a key fob that transmits angle of departure (AoD) packets to the verifier device that is a mobile wireless telephone that has two antennas separated by a known distance, to perform angle of departure (AoD) estimation of the distance between the two wireless devices, the verifier device determining a first angle of departure using a first antenna and determining the second angle of departure using a second antenna, the first antenna being spatially separate from the second antenna, in accordance with at least one embodiment of the present invention.

FIG. 1E illustrates an example embodiment of the invention, wherein examples of removable storage media are shown, based on magnetic, electronic and/or optical technologies, such as magnetic disks, optical disks, semiconductor memory circuit devices, and micro-SD memory cards for storing data and/or computer program code as an example computer program product, in accordance with at least one embodiment of the present invention.

estimation, showing an example of how the bits in a reference pattern in an angle of departure packet are transmitted by the antenna array of the prover device and sampled at the verifier device, in accordance with at least one embodiment of the present invention.

Figure 3A:
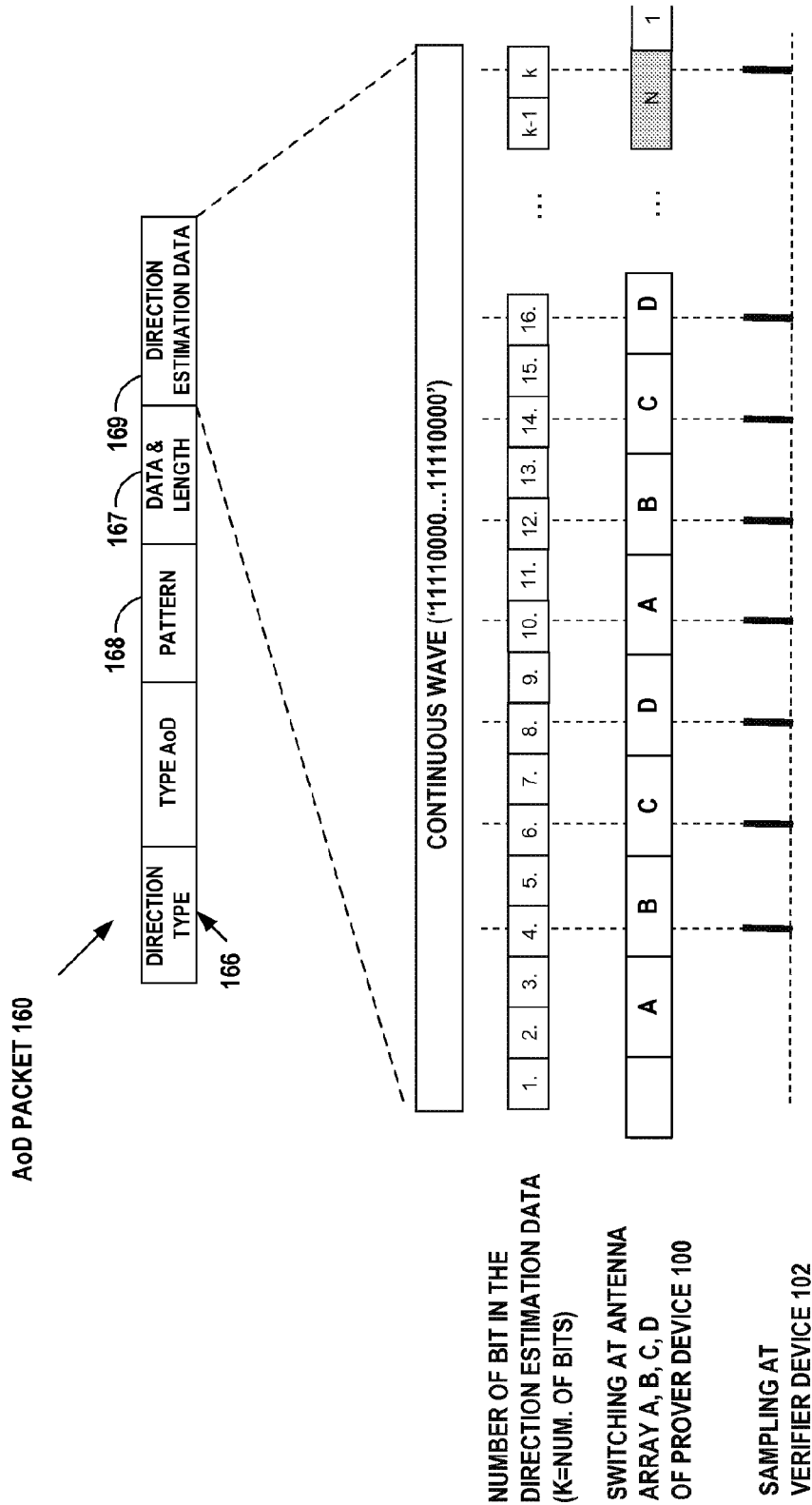
FIG. 3A illustrates an example embodiment of the invention, depicting an example of angle of departure (AoD)
Figure 3B:
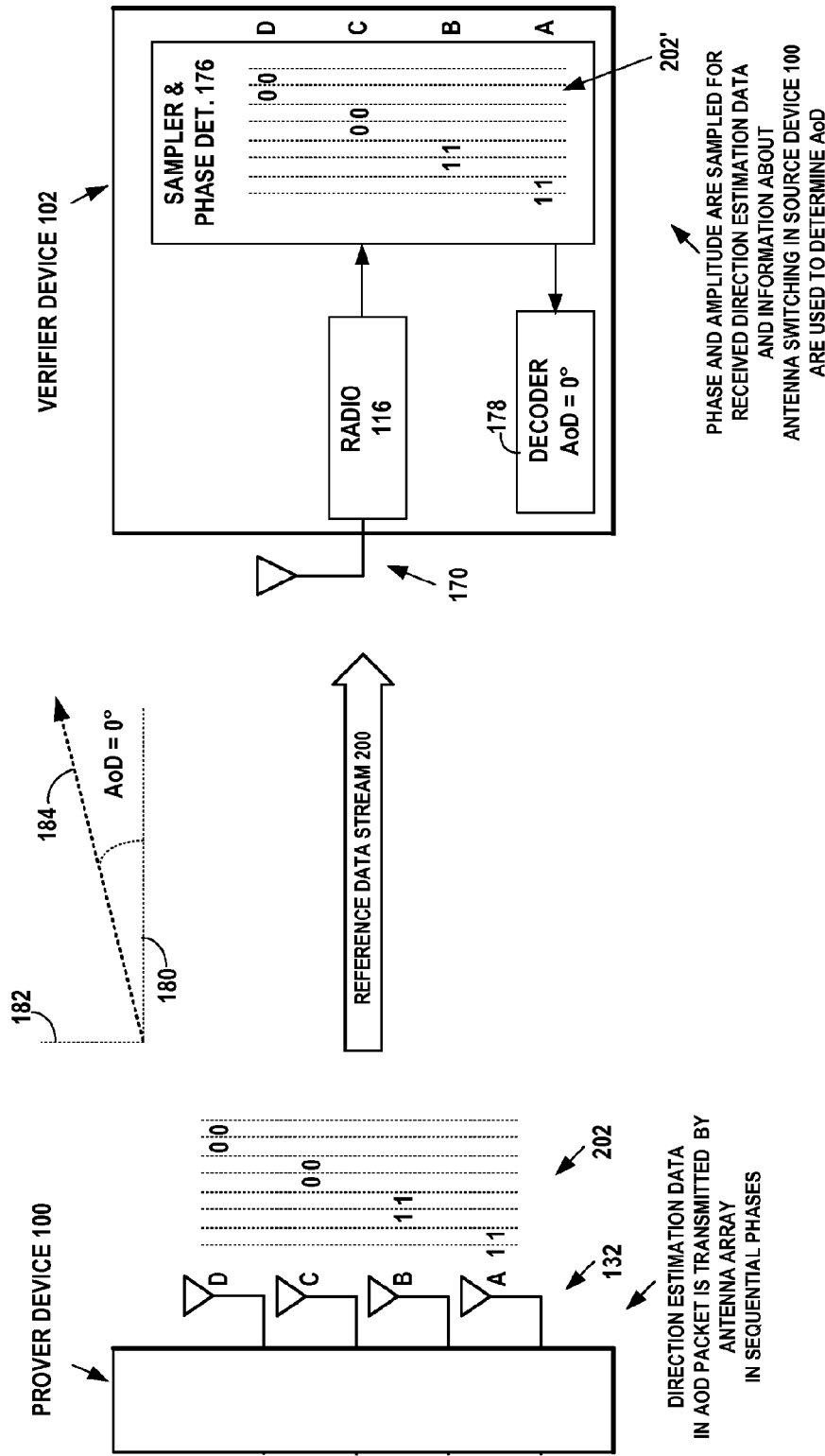

FIG. 3B illustrates an example embodiment of the invention, depicting an example of angle of departure (AoD) estimation, showing an example network diagram illustrating a relative location along a first axis of the prover device and the verifier device. In embodiments of the invention, the prover device transmits the reference data stream, the verifier device receives the reference data stream and it decodes the reference data stream to obtain a direction value, in accordance with at least one embodiment of the present invention.

FIG. 3C illustrates an example embodiment of the invention, depicting for an example of angle of departure (AoD) estimation, showing an example network diagram illustrating a second relative location along a second axis offset from the first axis, of the prover device and the verifier device. In embodiments of the invention, the prover device transmits a reference data stream, the verifier device receives the reference data stream and it decodes the reference data stream to obtain a direction value, in accordance with at least one embodiment of the present invention.

FIG. 4 illustrates an example embodiment of the invention, depicting an example of angle of departure (AoD) estimation in a flow diagram of an example method, from the point of view of the verifier device, in accordance with at least one embodiment of the present invention.

Figure 5A:
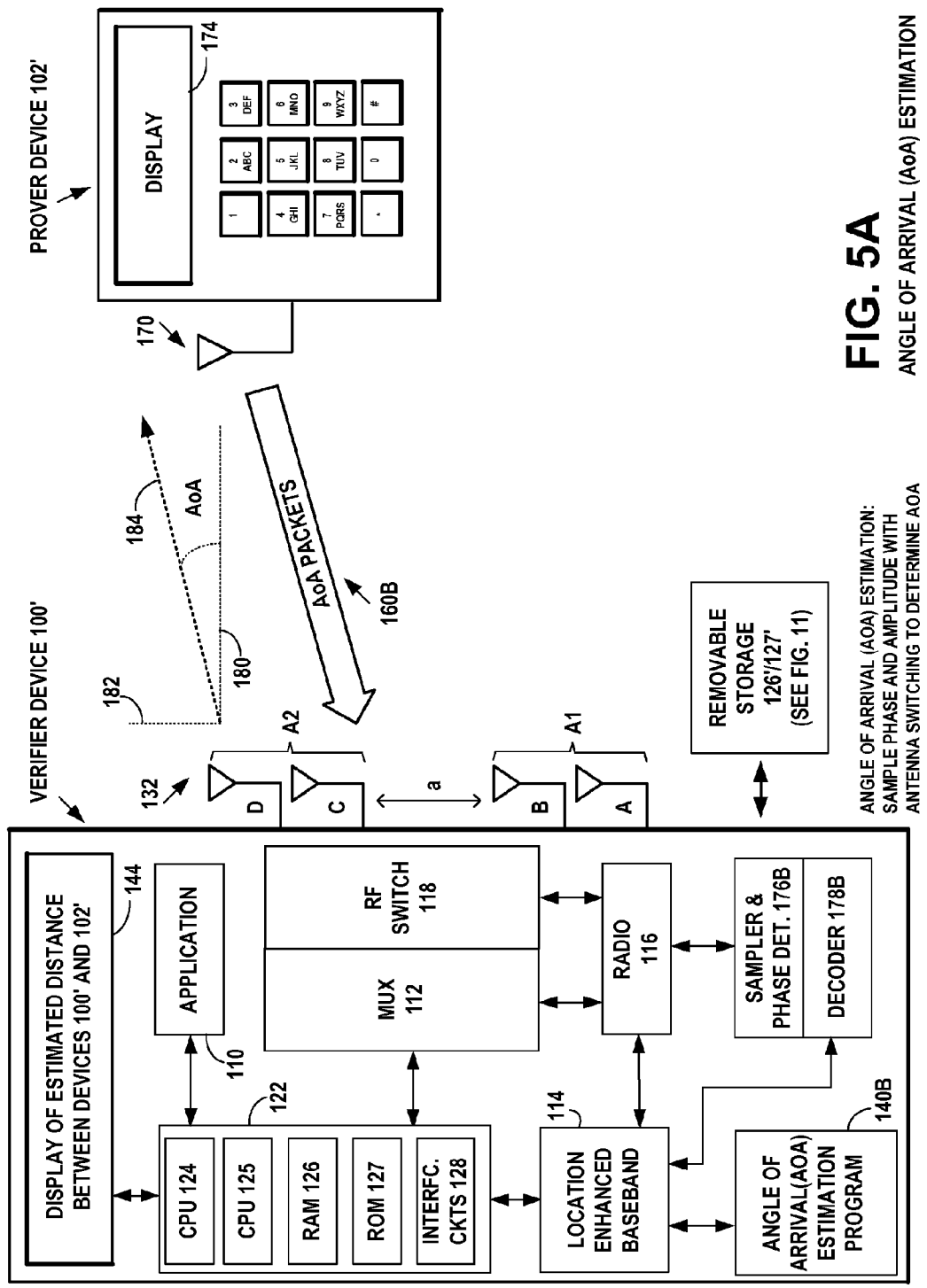

FIG. 5A illustrates an example embodiment of the invention, depicting an example of angle of arrival (AoA) estimation, showing an example network diagram of a prover device having a single antenna transmitting angle of arrival packets to a verifier device, the verifier device determining a first angle of arrival using a first antenna array and determining a second angle of arrival using a second antenna array, the first antenna array being spatially separate from the second antenna array, in accordance with at least one embodiment of the present invention.

Figure 5B:
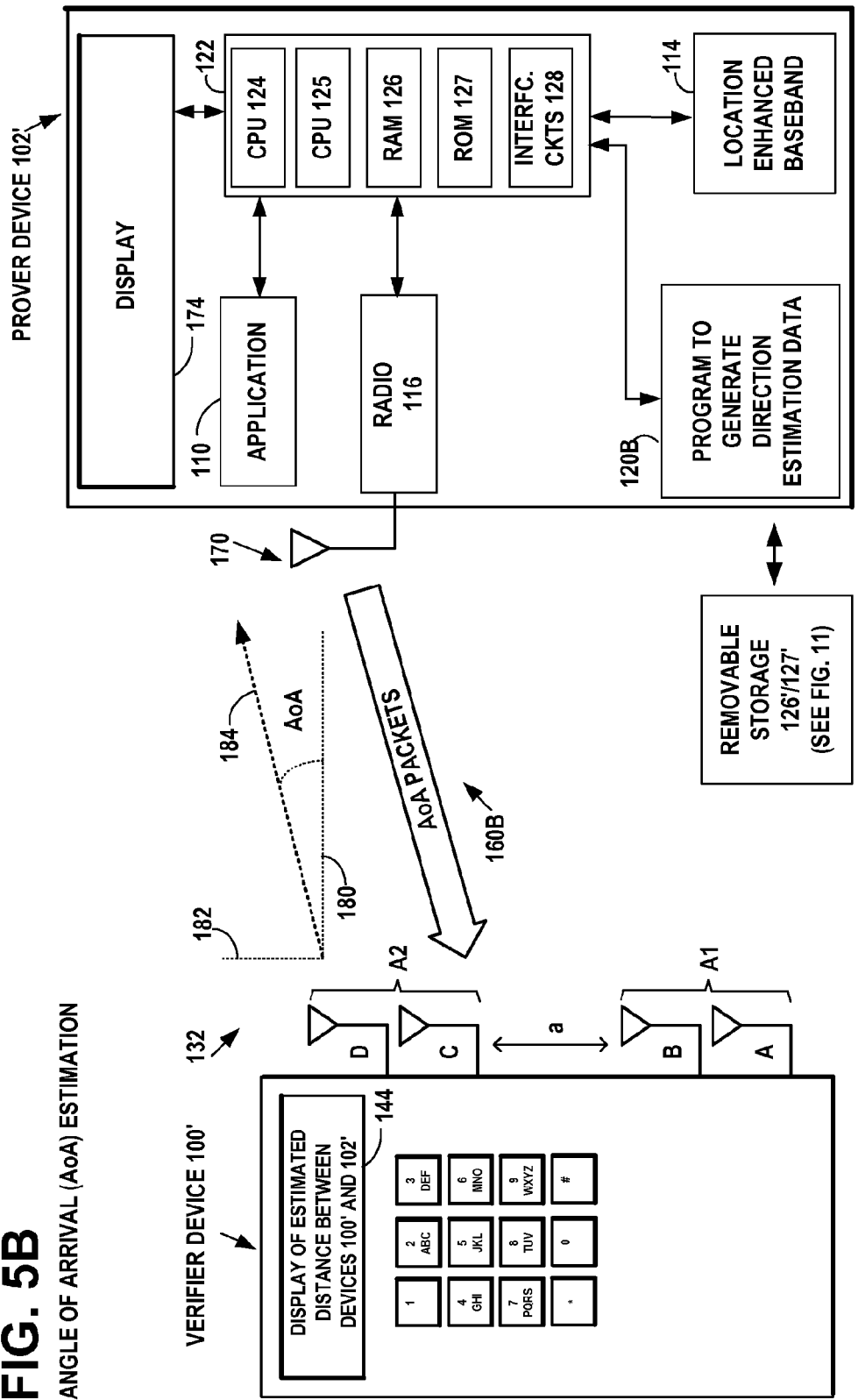

FIG. 5B illustrates an example embodiment of the invention, depicting the example network diagram of FIG. 5A, showing more details of the prover device, in accordance with at least one embodiment of the present invention.

Figure 5C:
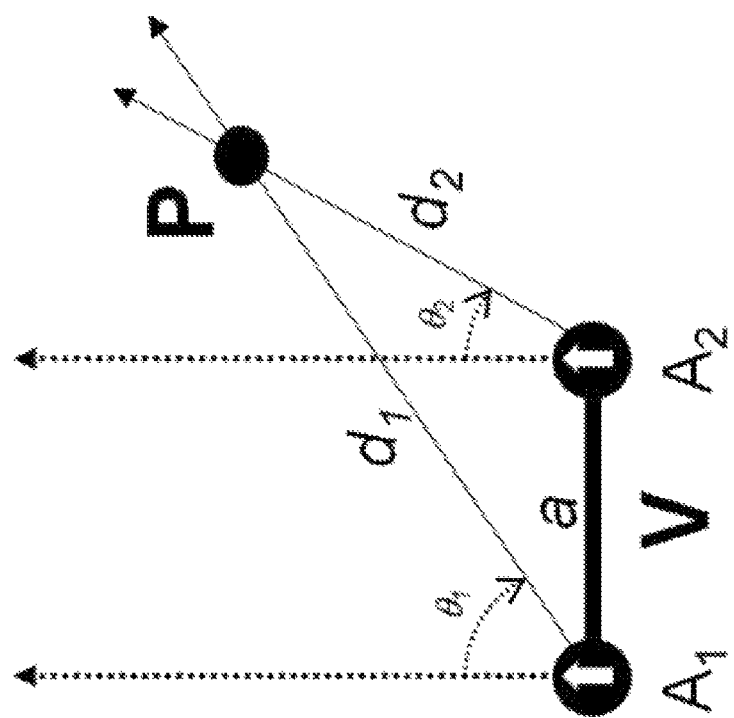

FIG. 5C illustrates an example embodiment of the invention, depicting a determination by the verifier device of a first angle of arrival and a second angle of arrival sent from the prover device and a generation of distance estimation data based on the determined first angle of arrival and second angle of arrival, wherein the verifier device that has two antenna arrays separated by a known distance, in accordance with at least one embodiment of the present invention.

FIG. 5D illustrates an example embodiment of the invention shown in FIGS. 5A, 5B, and 5C, wherein the prover device is a key fob that transmits angle of arrival (AoA) packets to the verifier device that is a mobile wireless telephone, the verifier device 100' determining a first angle of arrival using a first antenna array A1 and determining a second angle of arrival using a second antenna array A2, the first antenna array A1 being spatially separate from the second antenna array A2, in accordance with at least one embodiment of the present invention.

Figure 6A:
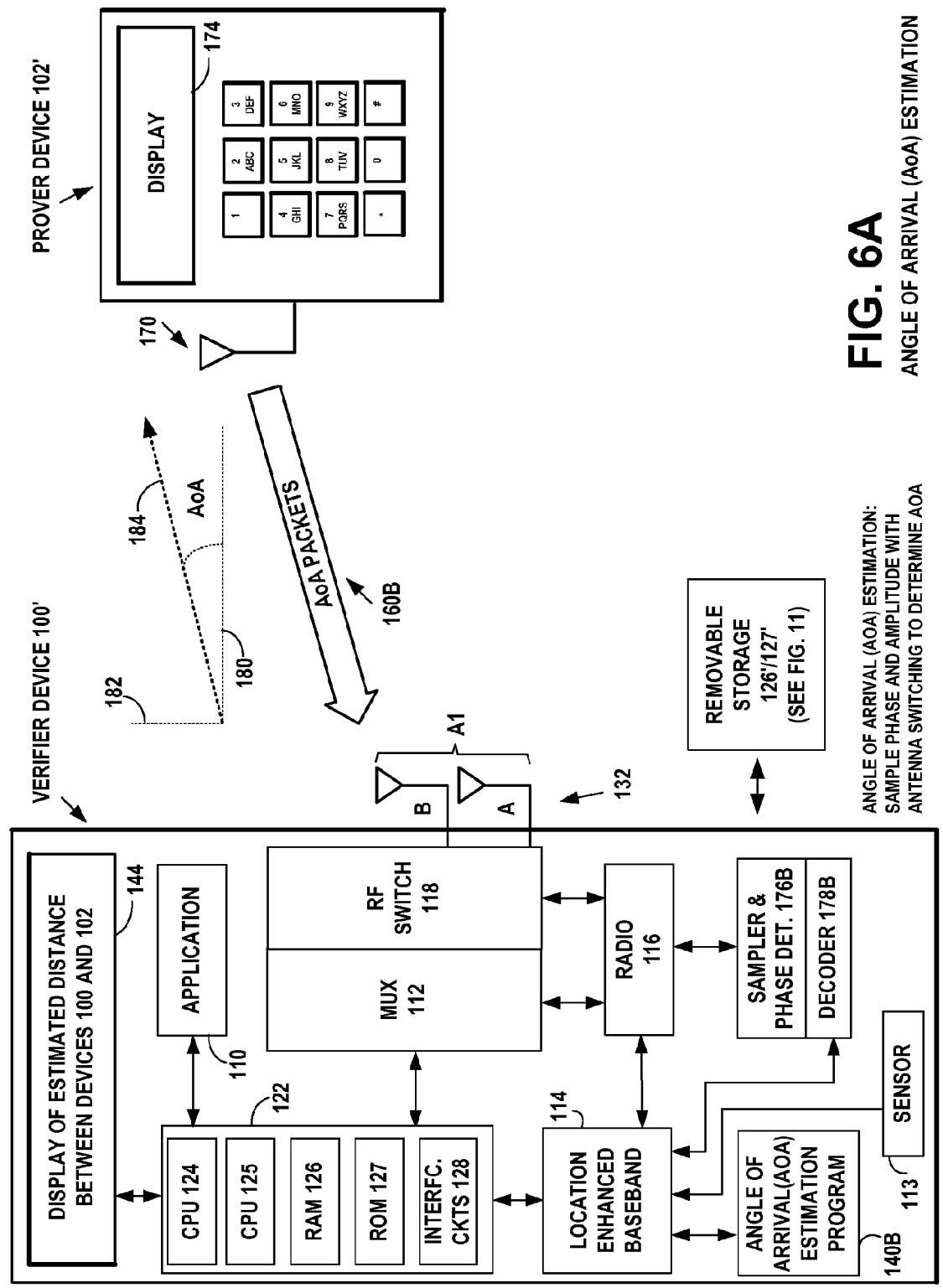

FIG. 6A illustrates an example embodiment of the invention, depicting an example of angle of arrival (AoA) estimation, showing an example network diagram of a prover device having a single antenna transmitting angle of arrival packets to a verifier device, the verifier device determining a first angle of arrival when the device receives the information packets in a single antenna array when the device is at a first location and determining a second angle of arrival when the device receives the information packets in the antenna array when the apparatus is at a second location, the first location being spatially separate from the second location, in accordance with at least one embodiment of the present invention.

Figure 6B:
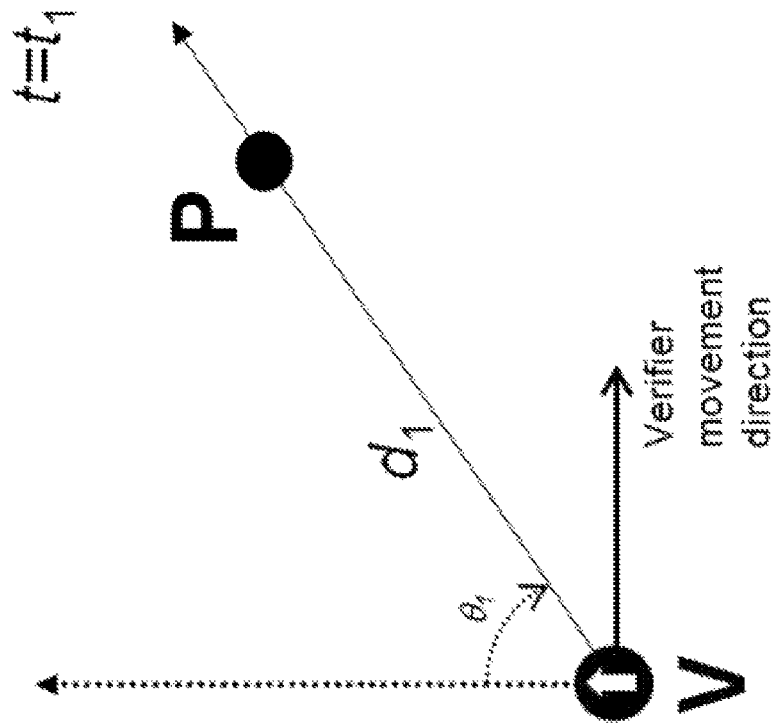

FIG. 6B illustrates an example embodiment of the invention, depicting a determination by the verifier device of a first angle of arrival at a first location, in accordance with at least one embodiment of the present invention.

Figure 6C:
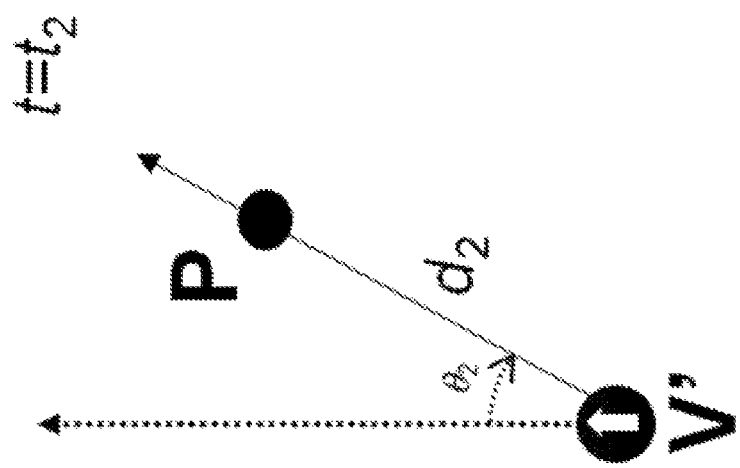

FIG. 6C illustrates an example embodiment of the invention, depicting a determination by the verifier device of a second angle of arrival at a second location, the first location being spatially separate from the second location, and a generation of distance estimation data based on the determined first angle of arrival and second angle of arrival, wherein the verifier device that has a single antenna array, in accordance with at least one embodiment of the present invention.

Figure 7A:
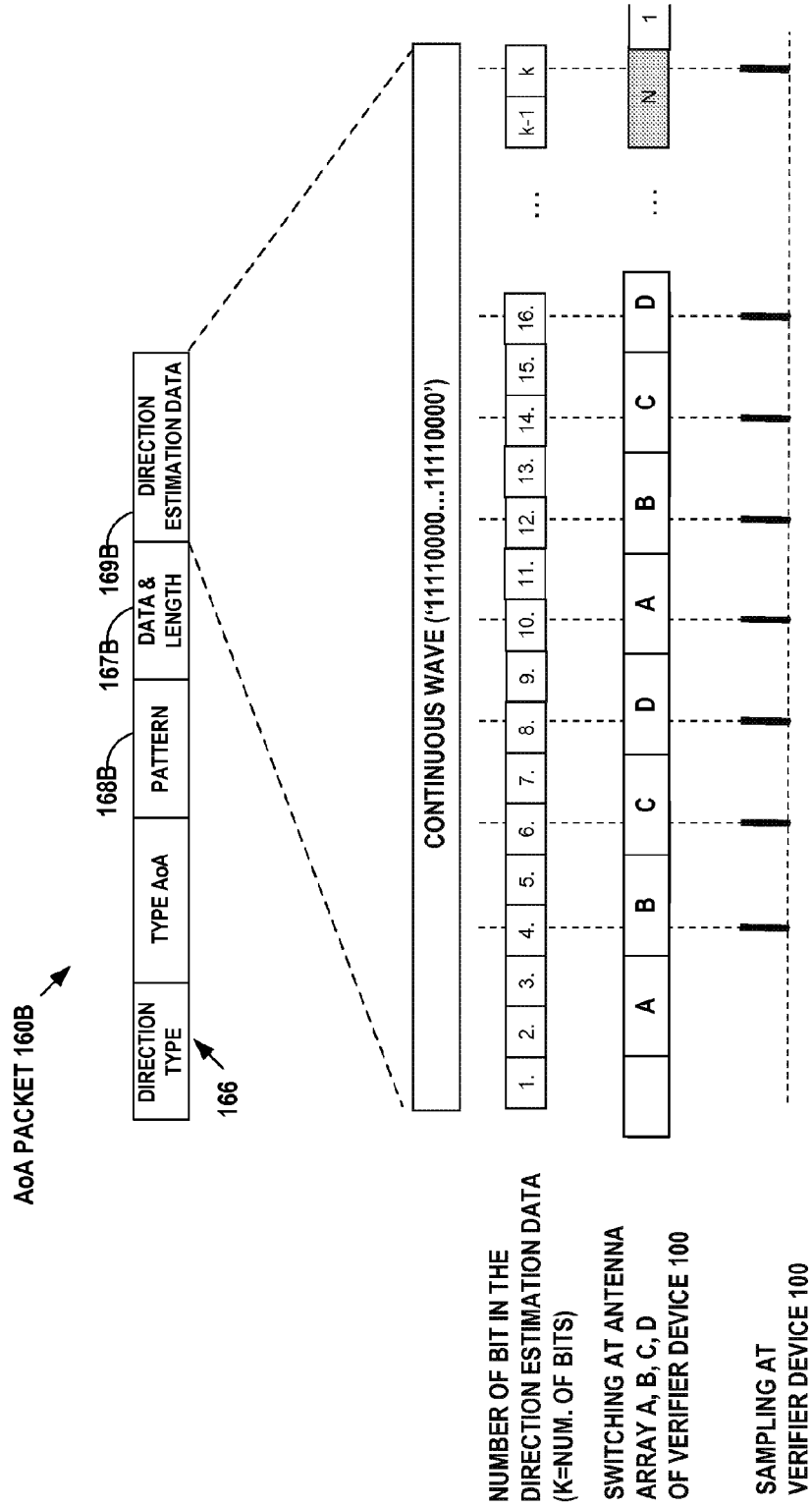

FIG. 7A illustrates an example embodiment of the invention, depicting an example of angle of arrival (AoA) estimation, showing an example of how the bits in the reference pattern from the angle of arrival packet are transmitted by the single antenna at the prover device and received by the antenna array and sampled at the verifier device, in accordance with at least one embodiment of the present invention.

FIG. 7B illustrates an example embodiment of the invention, depicting an example of angle of arrival (AoA) estimation, shows an example network diagram illustrating a relative location along a first axis of the prover device and the verifier device. In embodiments of the invention, the prover device transmits the reference data stream. The reference data stream transmission from the prover device is received by the antenna array at the verifier device, the antenna array sequentially switching the reference bits in the data stream during their reception. The verifier device receives the reference data stream and decodes the reference data stream to obtain a direction value, in accordance with at least one embodiment of the present invention.

Figure 7C:
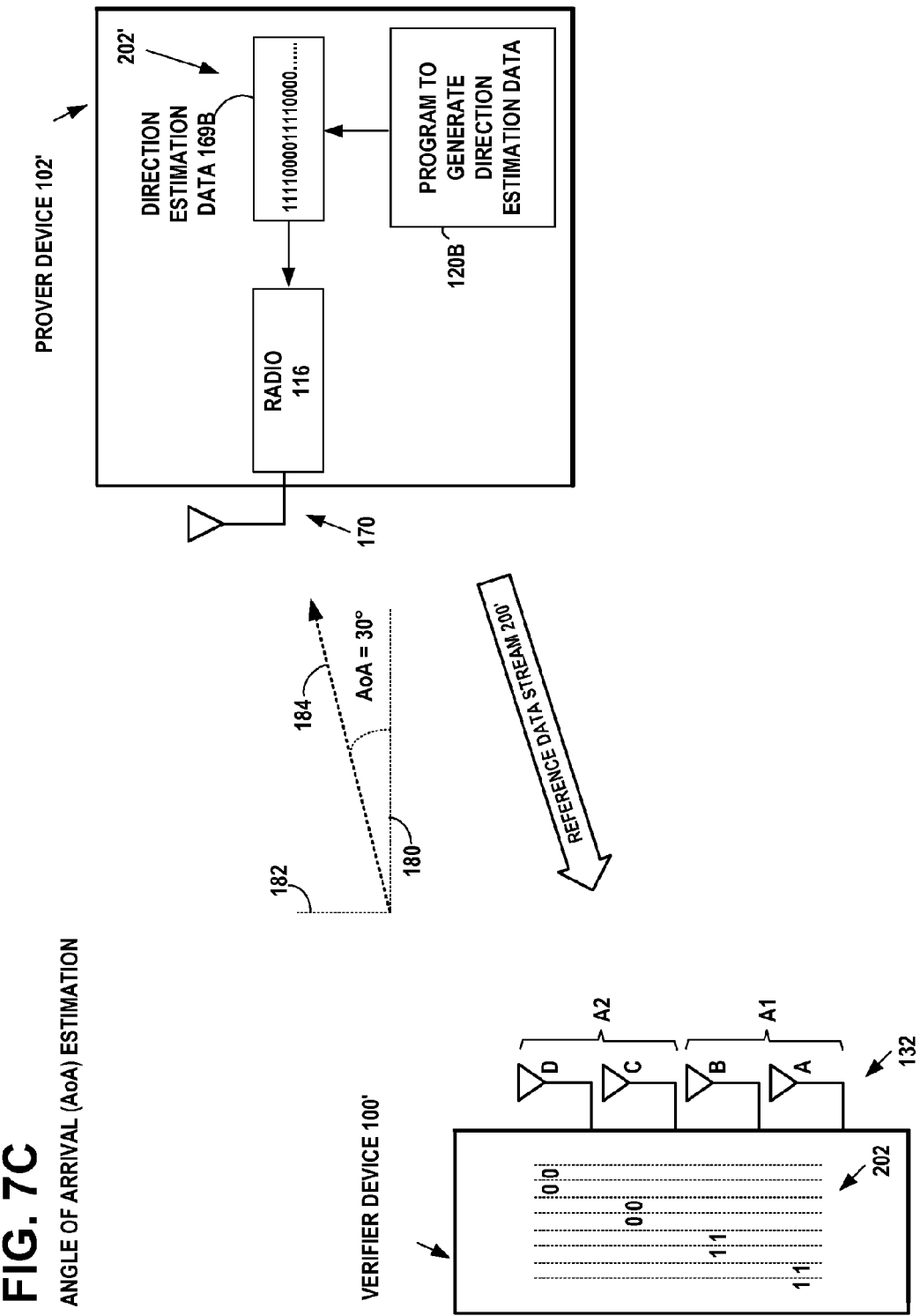

FIG. 7C illustrates an example embodiment of the invention, depicting an example of angle of arrival (AoA) estimation, showing an example network diagram illustrating a second relative location along a second axis offset from the first axis, of the prover device and the verifier device. In embodiments of the invention, the prover device transmits the reference data stream. The reference data stream transmission from the prover device is received by the antenna array at the verifier device, the antenna array sequentially switching the reference bits in the data stream during their reception. The verifier device receives the reference data stream and decodes the reference data stream to obtain a direction value, in accordance with at least one embodiment of the present invention.

FIG. 8 illustrates an example embodiment of the invention, depicting an example of angle of arrival (AoA) estimation, an example flow diagram of an example method, from the point of view of the verifier device, in accordance with at least one embodiment of the present invention.

Figure 9:
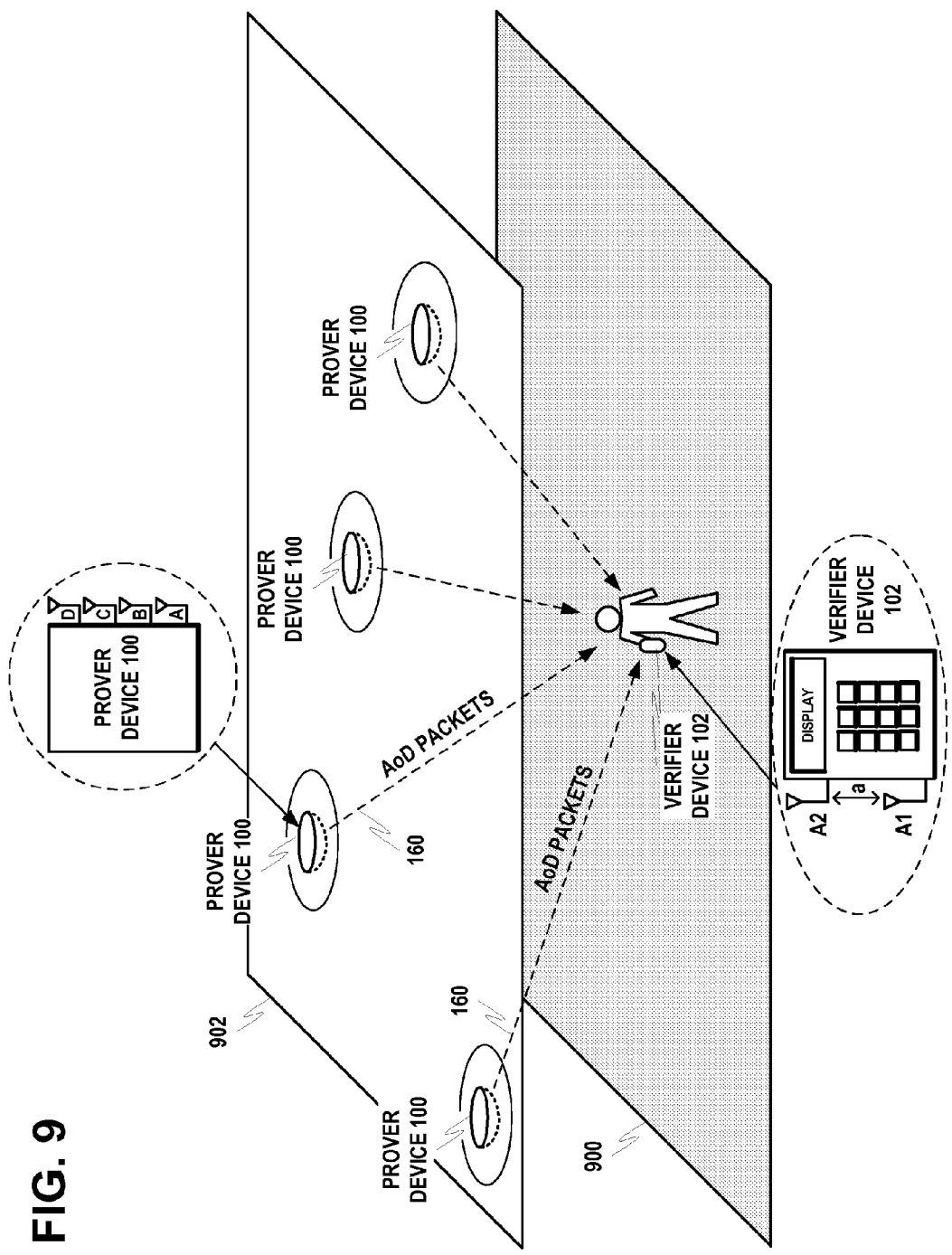

FIG. 9 illustrates a network of ceiling beacons that incorporate angle of departure (AoD) estimation being used to estimate a distance between wireless devices, wherein a prover device in a ceiling beacon transmits angle of departure packets to a verifier device in a mobile communications device that has two antennas separated by a known distance, the verifier device determining a first angle of departure using a first antenna and determining the second angle of departure using a second antenna, the first antenna being spatially separate from the second antenna, in accordance with at least one embodiment of the present invention.

Figure 10A:
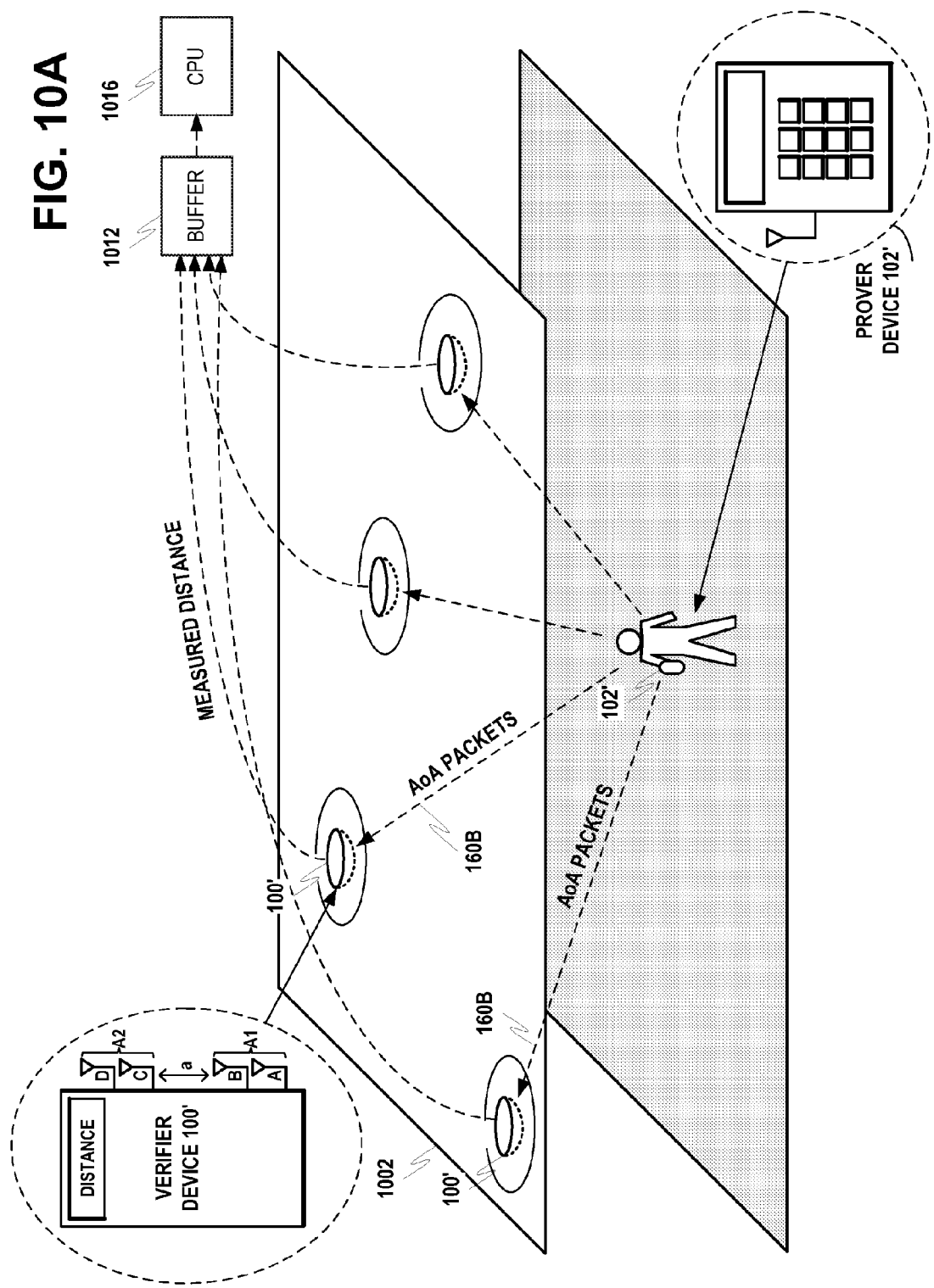

FIG. 10A illustrates a network of ceiling beacons that incorporate angle of arrival (AoA) estimation, showing an example network diagram of a prover device in a mobile communications device having a single antenna transmitting angle of arrival packets to a verifier device in a ceiling beacon, the verifier device determining a first angle of arrival using a first antenna array and determining a second angle of arrival using a second antenna array, the first antenna array being spatially separate from the second antenna array, in accordance with at least one embodiment of the present invention.

Figure 10B:
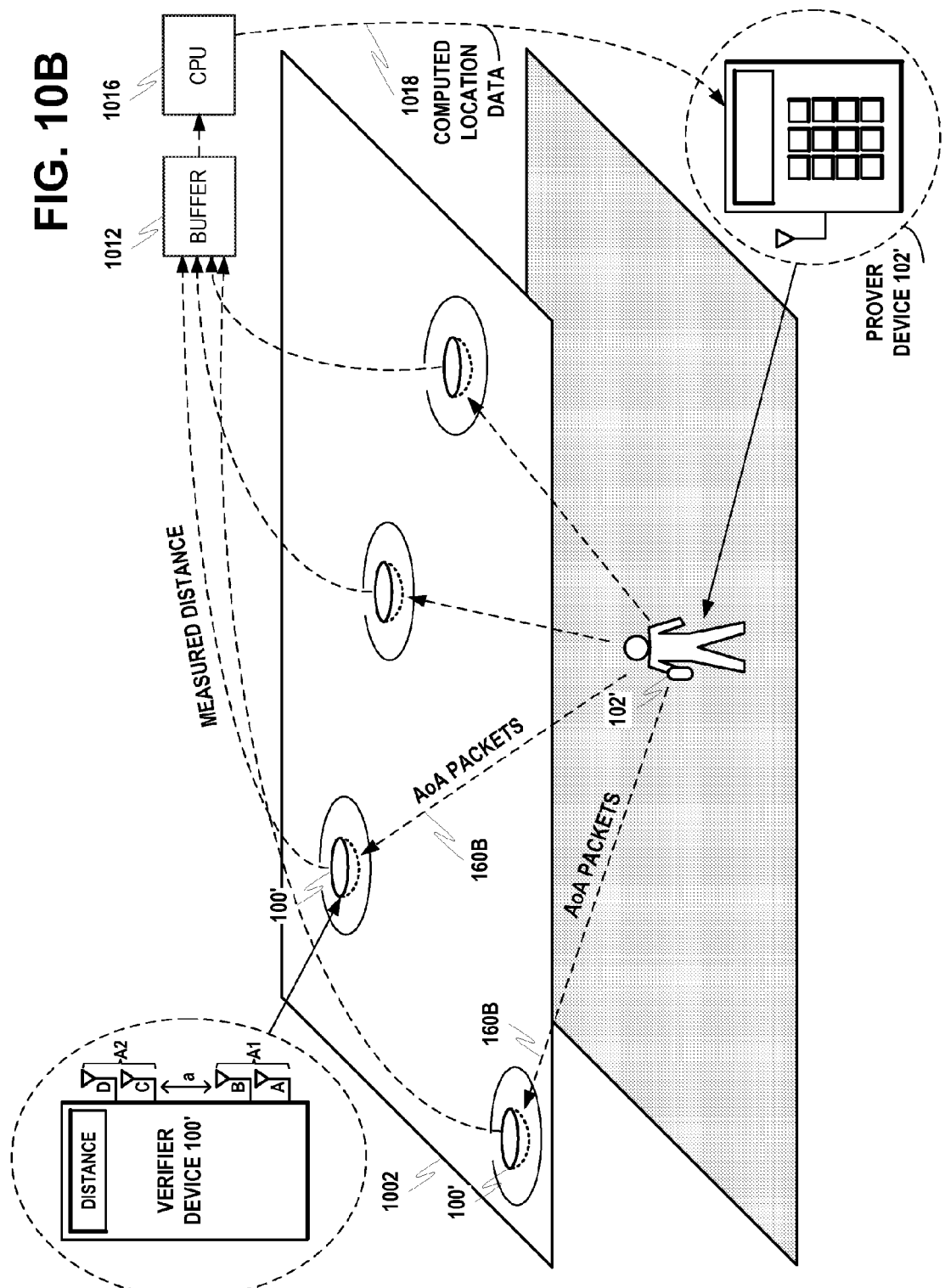

FIG. 10B illustrates an example embodiment of the invention, wherein the network of ceiling beacons that incorporate angle of arrival (AoA) estimation, as shown in FIG. 10A. The two dimensional or three dimensional location of the prover device held by the user, as computed by the CPU, is fed back to the prover device 102' held by the user, for purposes, such as displaying navigational information, in accordance with at least one embodiment of the present invention.

FIG. 11A illustrates an example embodiment of the invention, depicting secure distance bounding using AoD measurements, with an antenna array in the prover and two antennas in the verifier, in accordance with at least one embodiment of the present invention.

FIG. 11B illustrates an example embodiment of the invention, depicting secure distance bounding using AoD measurements, with an antenna array in the verifier, two antennas in the prover, in accordance with at least one embodiment of the present invention.

Figure 12A:
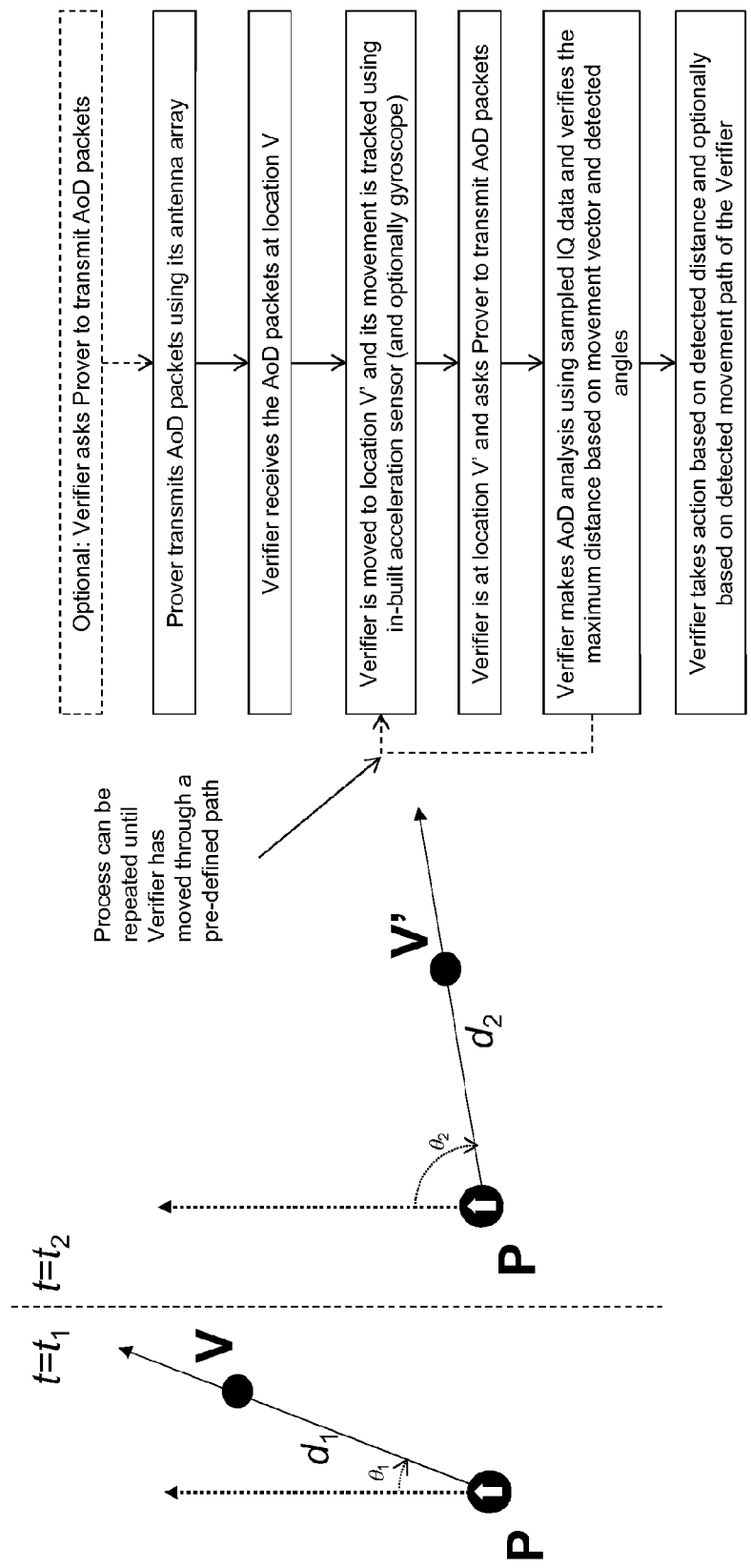

FIG. 12A illustrates an example embodiment of the invention, depicting secure distance bounding using AoD measurements, with an antenna array in the prover and an acceleration sensor in the verifier, in accordance with at least one embodiment of the present invention.

Figure 12B:
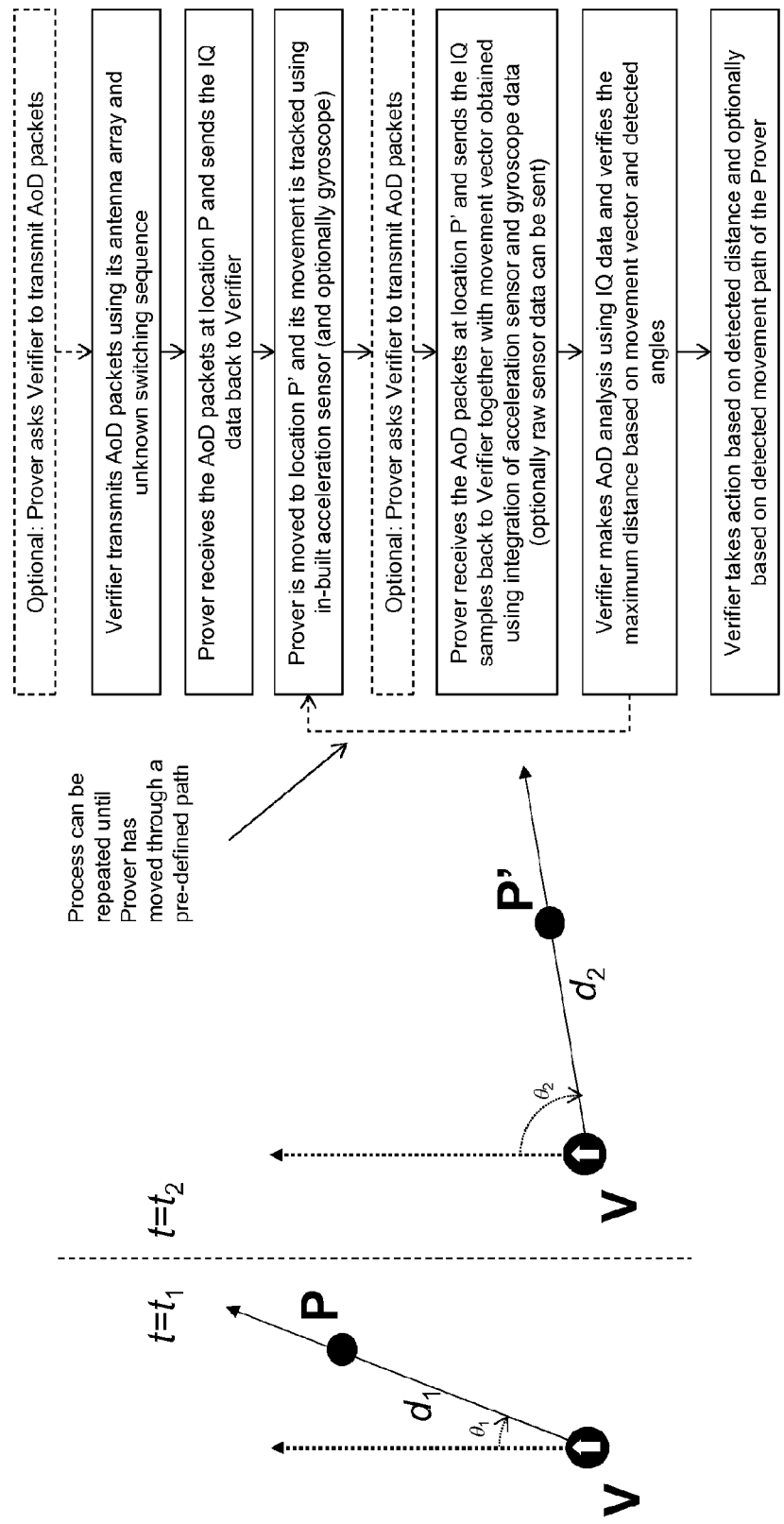

FIG. 12B illustrates an example embodiment of the invention, depicting secure distance bounding using AoD measurements, with an antenna array in the verifier and an acceleration sensor in the prover, in accordance with at least one embodiment of the present invention.

FIG. 13A illustrates an example embodiment of the invention, depicting secure distance bounding using AoD measurements, with two antenna arrays in the verifier, in accordance with at least one embodiment of the present invention.

FIG. 13B illustrates an example embodiment of the invention, depicting secure distance bounding using AoD measurements, with two antenna arrays in the prover, in accordance with at least one embodiment of the present invention.

Figure 14A:
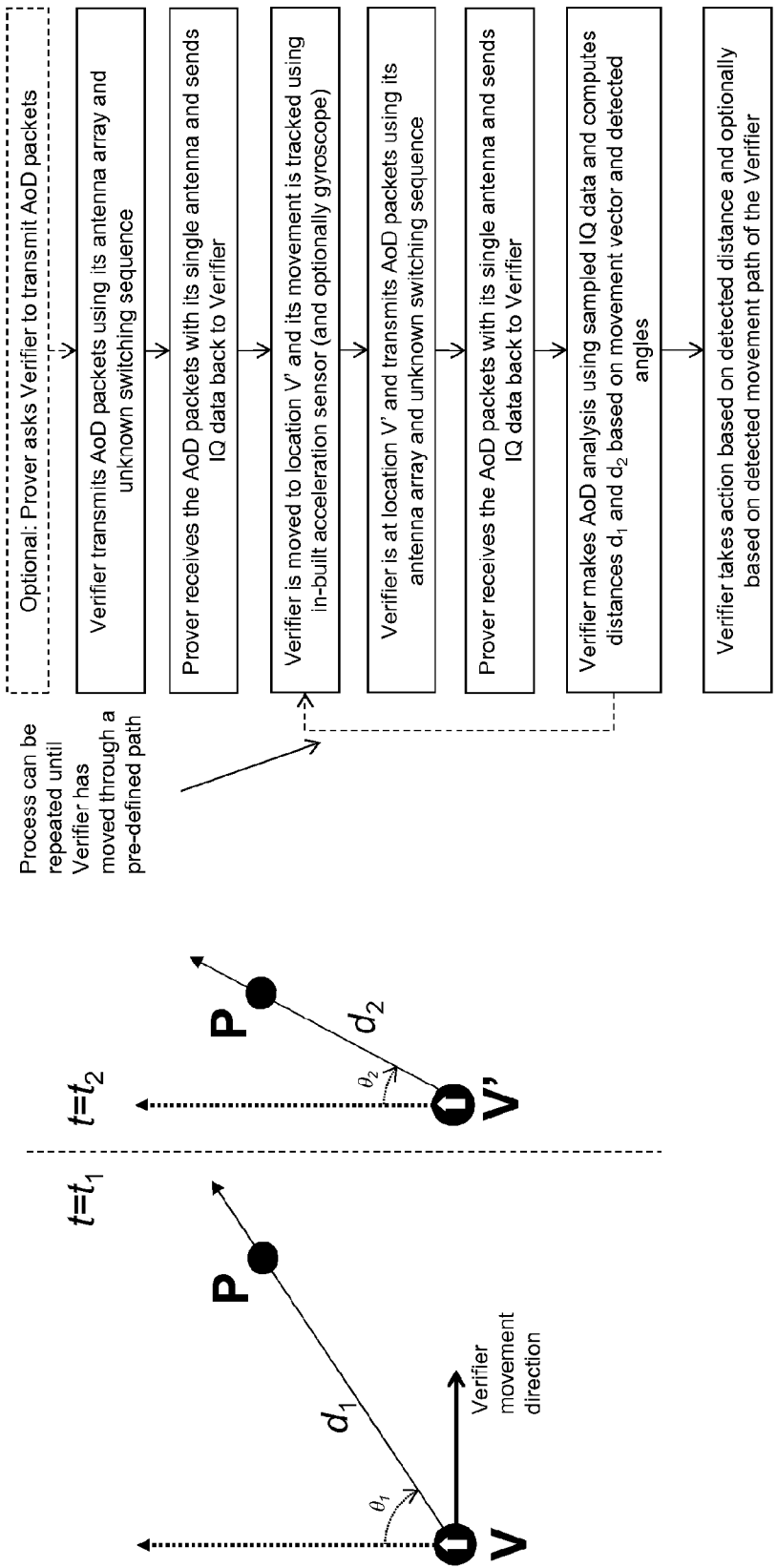

FIG. 14A illustrates an example embodiment of the invention, depicting secure distance bounding using AoD measurements, with an antenna array and an acceleration sensor in the verifier, in accordance with at least one embodiment of the present invention.

Figure 14B:
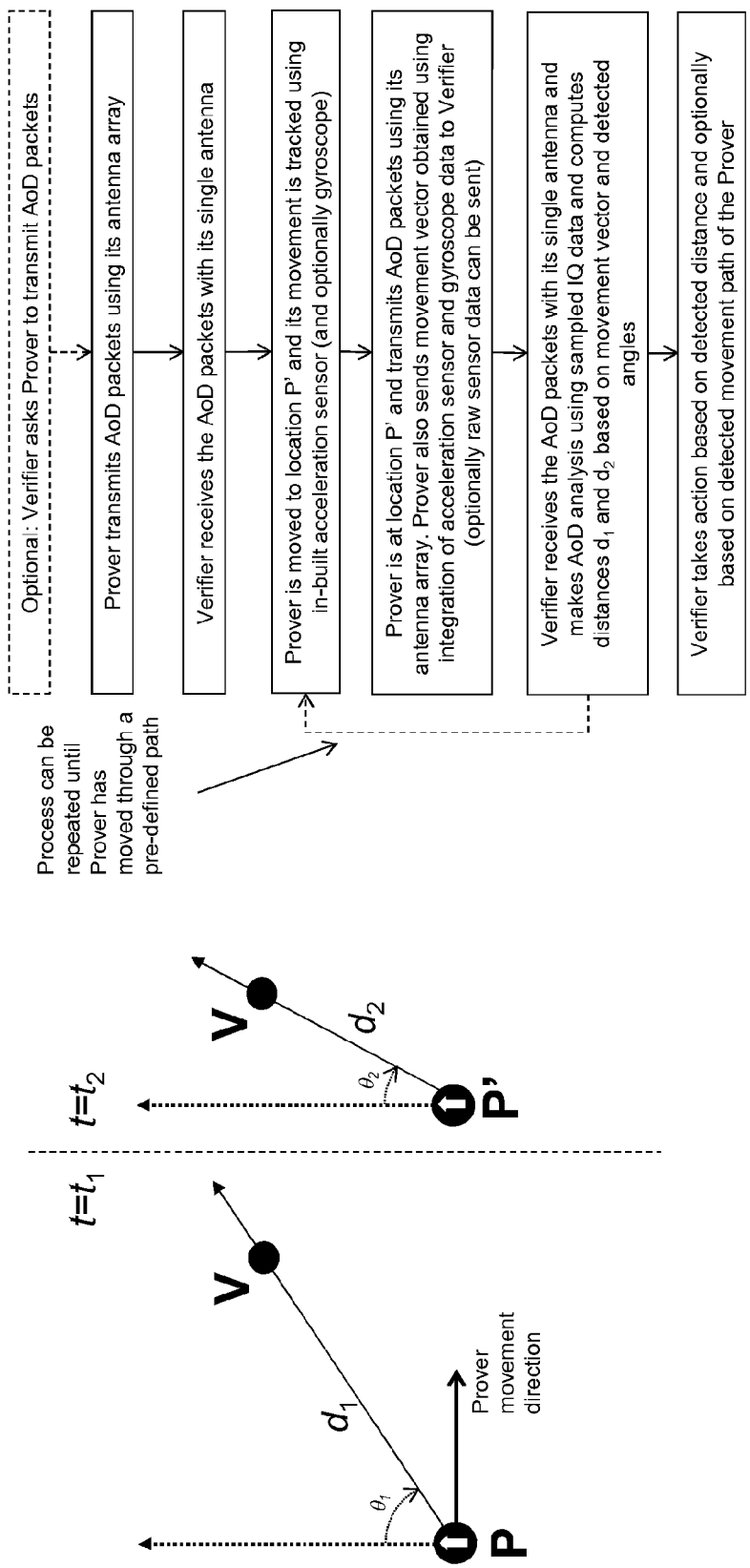

FIG. 14B illustrates an example embodiment of the invention, depicting secure distance bounding using AoD measurements, with an antenna array and an acceleration sensor in the prover, in accordance with at least one embodiment of the present invention.

FIG. 15A illustrates an example embodiment of the invention, depicting secure distance bounding using AoD measurements, with two antenna arrays in the verifier and two antennas in the prover, in accordance with at least one embodiment of the present invention.

FIG. 15B illustrates an example embodiment of the invention, depicting secure distance bounding using AoD measurements, with two antenna arrays in the prover and two antennas in the verifier, in accordance with at least one embodiment of the present invention.

FIG. 16 illustrates an example embodiment of the invention, depicting secure distance bounding using combined AoD and AoA measurements, with two antenna arrays in the verifier and one antenna array in the prover, in accordance with at least one embodiment of the present invention.

DISCUSSION OF EXAMPLE EMBODIMENTS OF THE INVENTION

This section is organized into the following topics:
I. Terminology
II. Distance Estimation
A. Examples of Angle of Departure (AoD) Estimation,
B. Examples of Angle of Arrival (AoA) Estimation
I. Terminology The term "angle of departure (AoD)", as used herein, is employed with reference to an array of antennas arranged with a normal axis. For a linear antenna array along a linear axis, a normal axis perpendicular to the linear axis defines a plane with the linear antenna array. The apparent direction of transmission of a signal from the linear antenna array, as seen from a remote receiving device occupying the plane, may be represented by an observation vector. The angle between the observation vector and the normal axis is defined as the angle of departure (AoD) of the signal as it leaves the antenna array. In embodiments, the antenna array may be arranged in a two-dimensional array in a plane and the normal axis is perpendicular to the plane of the antenna array. In this arrangement, the angle of departure (AoD) is similarly defined as the angle between the observation vector and the normal axis to the plane. In embodiments, the antenna array may be arranged in any arbitrary manner, either in a linear array, a two-dimensional array, or a three dimensional array.

The term "angle of arrival (AoA)", as used herein, is employed with reference to an array of antennas arranged with a normal axis. For a linear antenna array along a linear axis, a normal axis perpendicular to the linear axis defines a plane with the linear antenna array. The apparent direction of reception of a signal by the linear antenna array, as seen from a remote transmitting device occupying the plane, may be represented by an observation vector. The angle between the observation vector and the normal axis is defined as the angle of arrival (AoA) of the signal as it approaches the antenna array. In embodiments, the antenna array may be arranged in a two-dimensional array in a plane and the normal axis is perpendicular to the plane of the antenna array. In this arrangement, the angle of arrival (AoA) is similarly defined as the angle between the observation vector and the normal axis to the plane. In embodiments, the antenna array may be arranged in any arbitrary manner, either in a linear array, a two-dimensional array, or a three dimensional array.

II. Distance Estimation

Proving the proximity of a wireless device may be an important consideration in granting it access to a wireless system. In secure distance estimation or bounding, a wireless prover device attempts to prove its distance from a wireless verifier device and the verifier device attempts to verify the location of the prover device. A related concept is location bounding, which is a process to enable a verifier to establish a two-dimensional upper boundary on the physical area within which a prover is located.

A. Examples of Angle of Departure (AoD) Estimation

The term "angle of departure (AoD)", as used herein, is employed with reference to an array of antennas arranged with a normal axis. For a linear antenna array along a linear axis, a normal axis perpendicular to the linear axis defines a plane with the linear antenna array. The apparent direction of transmission of a signal from the linear antenna array, as seen from a remote receiving device occupying the plane, may be represented by an observation vector. The angle between the observation vector and the normal axis is defined as the angle of departure (AoD) of the signal as it leaves the antenna array. In embodiments, the antenna array may be arranged in a two-dimensional array in a plane and the normal axis is perpendicular to the plane of the antenna array. In this arrangement, the angle of departure (AoD) is similarly defined as the angle between the observation vector and the normal axis to the plane. In embodiments, the antenna array may be arranged in any arbitrary manner, either in a linear array, a two-dimensional array, or a three dimensional array.

Figure 1A:
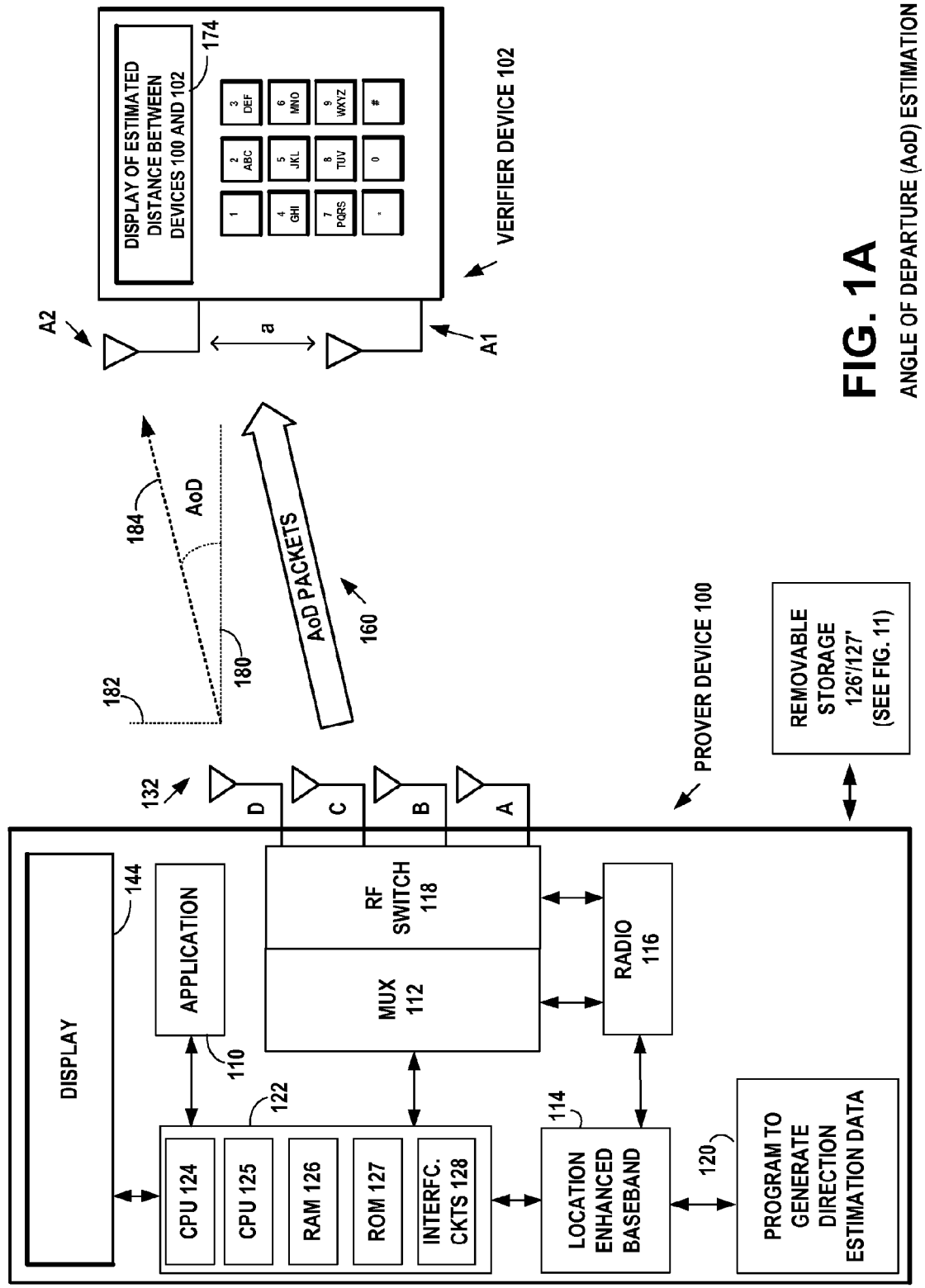
FIG. 1A illustrates an example embodiment of the invention, depicting an example network diagram showing angle of departure (AoD) estimation being used to estimate a distance between wireless devices, wherein a prover device transmits angle of departure packets to a verifier device that has two antennas separated by a known distance, the verifier device determining a first angle of departure using a first antenna and determining the second angle of departure using a second antenna, the first antenna being spatially separate from the second antenna, in accordance with at least one embodiment of the present invention.

1. Secure Distance Bounding Using AoD Measurements and Two Antennas in the Verifier FIG. 1A illustrates an example embodiment of the invention, depicting an example network diagram showing angle of departure (AoD) estimation being used to estimate a distance between wireless devices, wherein a prover device 100 transmits angle of departure packets 160 to a verifier device 102 that has two antennas A1 and A2 separated by a known distance "a", the verifier device 102 determining a first angle of departure $\theta_1$ using a first antenna A1 and determining the second angle of departure $\theta_2$ using a second antenna, the first antenna being spatially separate from the second antenna by the distance "a", in accordance with at least one embodiment of the present invention.

In example embodiments of the invention, the prover device 100 may transmit an angle of departure packet 160 that includes direction estimation data, in accordance with at least one embodiment of the present invention. The prover device 100 includes the program 120 to generate the direction estimation data. The direction estimation data may include an indication whether the packet relates to angle-of-arrival (AoA) information, angle-of-departure (AoD) information, or both types. The direction estimation data may include a reference binary bit pattern, such as "11110000", as shown in FIG. 3A, which illustrates an example of how the bits in the direction estimation data 169 from the angle of departure packet 160 are transmitted by the antenna array 132 at the prover device 100 and sampled at the verifier device 102, in accordance with at least one embodiment of the present invention.

In example embodiments of the invention, the direction estimation data may include a data and length field, that includes data such as coding, length of the direction estimation data, properties of the antennas A, B, C, and D, and other factors useful in enabling the verifier device 102 to estimate a direction. In embodiments of the invention, the prover device 100 transmits the angle of departure packet 160, wherein the multiplexer 112 directs the RF signal bearing the angle of departure packet 160, from the radio 116 to one of the antennas A, B, C, or D in the antenna array 132 for transmission.

In embodiments of the invention, the multiplexer 112 passes the direction estimation data to a commutating RF switch 118 that connects the transmitter of the radio 116 to the antenna array 132 of antennas A, B, C, and D. The commutating RF switch 118 sequentially activates each of the four antennas A, B, C, and D at a commutating frequency to sequentially transmit 2-bit portions of the direction estimation data in a reference data stream 200 shown in FIGS. 3B and 3C, having the repeated reference pattern of bits "11110000", each 2-bit portion being transmitted in a consecutive phase incremented by an interval.

In example embodiments of the invention, the program 120 to generate the direction estimation data, generates the reference pattern of bits "11110000" and direction estimation data. The direction estimation data in the angle of departure packet 160, is transmitted by antenna array in sequential phases. The four antennas A, B, C, and D of the antenna array 132 are shown in FIGS. 3B and 3C sequentially transmitting the 2-bit portions of the direction estimation data in a reference data stream 200, each 2-bit portion being transmitted in a consecutive phase incremented by a delay interval, thus forming the data stream 200. The 2-bit portions of the direction estimation data in the data stream 200 are only one example embodiment and the portion is not limited to bit intervals but may be arbitrary, also including any fraction of a bit interval or any number of bits in such portions may range from one to many.

In example embodiments of the invention, the four antennas A, B, C, and D of the antenna array 132 may be in a linear array or in an arbitrary array. An antenna array may be arranged in one, two, or three dimensions. For a linear array, the four antennas A, B, C, and D are mounted on the prover device 100 and arranged along a linear axis 182. A normal axis 180 is shown perpendicular to the linear axis 182. The two axes 180 and 182 define a plane within which the angle of departure (AoD) of the vector 184 lies, which will be the apparent direction of transmission of the reference data stream 200 from the prover device 100, as seen from the verifier device 102. The RF transmission emanating from each of the antennas A, B, C, and D may be an isotropic electromagnetic wave. When the reference data stream 200 is transmitted by the antenna array 132 in sequential phases, the verifier device 102 will have received the direction estimation data in the angle of departure packet 160. The direction estimating data includes data related to the characteristics of the antennas A, B, C, and D, the commutating frequency of the antennas, and other factors, The verifier device 102 is able to estimate the angle of departure (AoD) as the apparent direction of transmission of the reference data stream from the prover device 100, as seen from the verifier device 102.

The prover device 100 of FIG. 1A includes processor 122 that may access random access memory RAM 126 and/or read only memory ROM 127 in order to obtain stored program code and data for use during processing. RAM 126 or ROM 127 may generally include removable or imbedded memories that operate in a static or dynamic mode. Further, RAM 126 or ROM 127 may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 126'/127' and in FIG. 1E, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

Figure 1B:
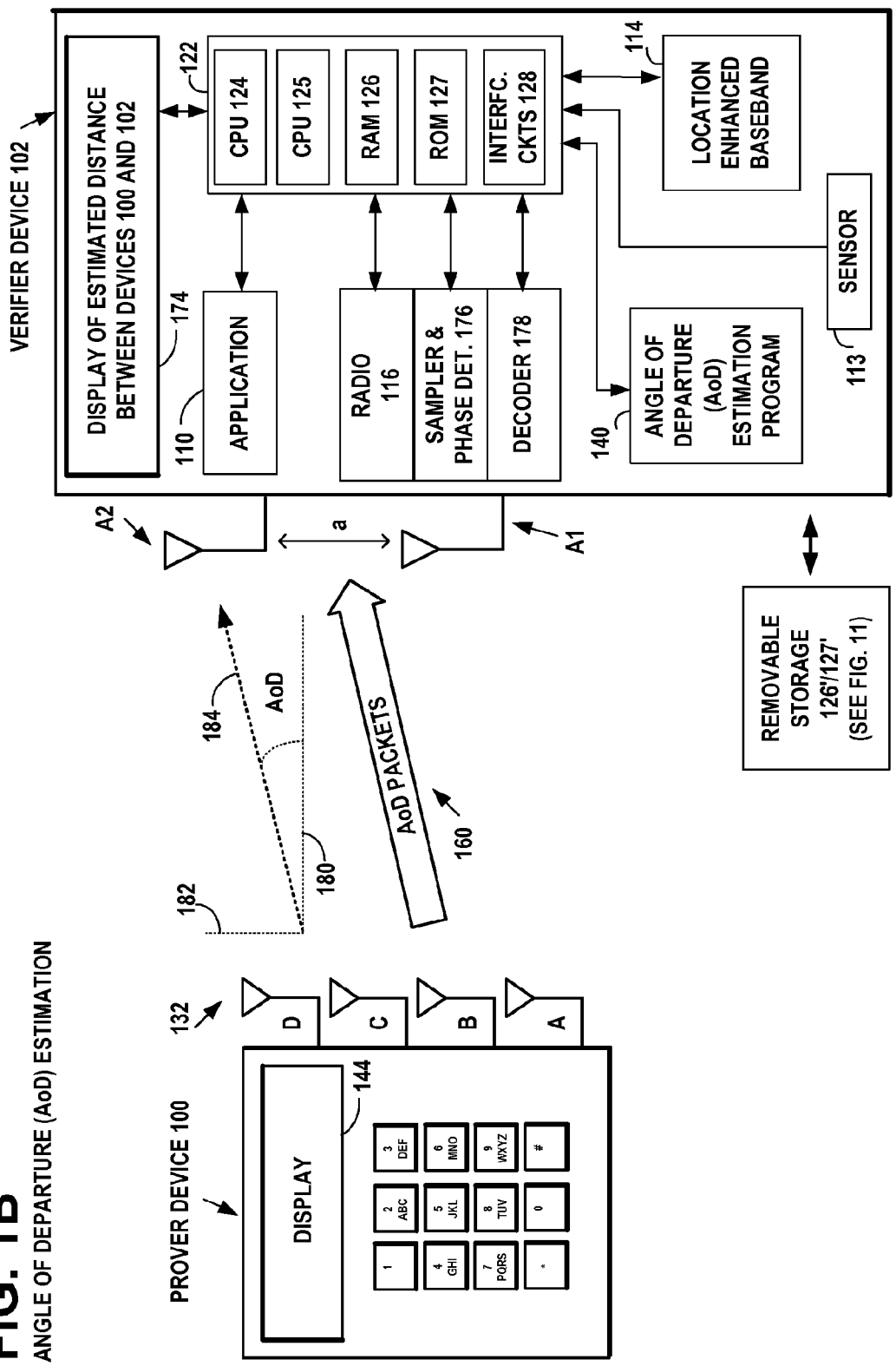
FIG. 1B illustrates an example embodiment of the invention, depicting the example network diagram of FIG. 1A, showing more details of the verifier device, in accordance with at least one embodiment of the present invention.

FIG. 1B illustrates an example embodiment of the invention, depicting the example network diagram of FIG. 1A, showing more details of the verifier device 102, in accordance with at least one embodiment of the present invention. The verifier device 102 receives the angle of departure packet 160 and estimates the first angle of departure $\theta_1$ using the first antenna A1 and estimates the second angle of departure $\theta_2$ using the second antenna A2.

In example embodiments of the invention, the verifier device 102 may include an angle of departure (AoD) estimation program 140. In embodiments of the invention, if the received angle of departure packet 160 includes the "Direction Type" indication identifying the packet as an angle of departure (AoD) packet, then the verifier device 102 begins sampling and phase detecting the sequentially transmitted reference data stream 200 of the direction estimation data, as shown in FIGS. 3A, 3B and 3C. The sampler and phase detector 176 performs a phase detection of the received 2-bit portions of the direction estimation data in the reference data stream 200 and their mutual phase offsets 202'. Data related to the characteristics of the antennas A, B, C, and D, the commutating frequency of the antennas at the prover device 100, and other factors, are included in the an angle of departure (AoD) packet 160, which enable an estimate to be made by the sampler and phase detector 176 and decoder 178 of the angle of departure (AoD) of the reference data stream 200. The verifier device 102 receives the angle of departure packet 160 and estimates the first angle of departure $\theta_1$ using the first antenna A1 and estimates the second angle of departure $\theta_2$ using the second antenna A2, in accordance with at least one embodiment of the present invention.

The verifier device 102 of FIG. 1B includes processor 122 that may access random access memory RAM 126 and/or read only memory ROM 127 in order to obtain stored program code and data for use during processing. RAM 126 or ROM 127 may generally include removable or imbedded memories that operate in a static or dynamic mode. Further, RAM 126 or ROM 127 may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 126'/127' and in FIG. 1E, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

Figure 1C:
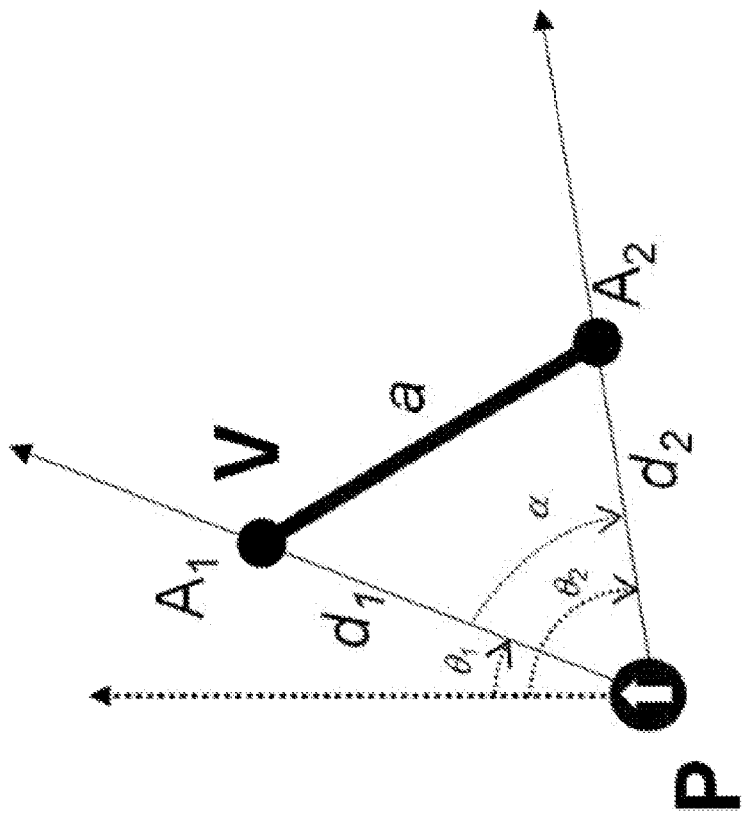
FIG. 1C illustrates an example embodiment of the invention, depicting a determination by the verifier device of a first angle of departure and a second angle of departure sent from the prover device and a generation of distance estimation data based on the determined first angle of departure and second angle of departure, wherein the verifier device has two antennas separated by a known distance, in accordance with at least one embodiment of the present invention.

FIG. 1C illustrates an example embodiment of the invention, depicting a determination by the verifier device 102 of a first angle of departure $\theta_1$ and a second angle of departure $\theta_2$ sent from the prover device and a generation of distance estimation data based on the determined first angle of departure $\theta_1$ and second angle of departure $\theta_2$, wherein the verifier device has two antennas A1 and A2 separated by a known distance "a", in accordance with at least one embodiment of the present invention.

FIG. 1C shows the verifier V has two in-built antennas A1 and A2 physically fixed at a known distance "a" from each other, capable for receiving the angle of departure (AoD) packets transmitted by the prover P, separately using each of the antennas A1 and A2.

In example embodiments of the invention, based on the received packets, the verifier V may compute two directions $\theta_1$ and $\theta_2$. By setting a minimum requirement for the difference $\alpha$ between these two angles ($\alpha=\theta_2-\theta_1$), a maximum value is defined for the distances d1 and d2, respectively between the antenna A1 and the prover P and between the antenna A2 and the prover P, according to the following formula:

$$\max(d_1) = \max(d_2) = \frac{a}{\sqrt{2 - 2\cos\alpha}}$$

In example embodiments of the invention, depending on the available resolution in the two directions $\theta_1$ and $\theta_2$, a minimum value for a may also be defined.

In example embodiments of the invention, the four antennas A, B, C, and D of the antenna array 132 may be arranged in a two-dimensional array on the prover device 100, in a plane that is perpendicular to the normal axis 180. In this arrangement, the angle of departure (AoD) and the vector 184 may lie outside of the plane formed by the linear axis 182 and the normal axis 180, enabling a three-dimensional depiction of the direction of the prover device 100 with respect to the verifier device 102. An antenna array may be arranged one, two, or three dimensions.

In embodiments of the invention, the prover device 100 and the verifier device 102 include a processor 122 that includes from one to many central processing units (CPUs) 124 and 125, a random access memory (RAM) 126, a read only memory (ROM) 127, and interface circuits 128 to interface with one or more radio transceivers 116, battery or house power sources, keyboard, display 144, etc. The RAM and ROM can be removable memory devices such as smart cards, Subscriber Identity Modules (SIMs), Wireless Identity Modules (WIMs), semiconductor memories such as RAM, ROM, programmable read only memory (PROM), flash memory devices, etc. The processor 122 in the prover device 100 outputs data to the baseband 114 that packages the data into packets, such as angle of departure packets 160 that are input to the radio 116 for transmission. During transmission, the multiplexer 112 directs the radio frequency (RF) signal from the radio 116 to one of the antennas A, B, C, or D in the antenna array 132 for transmission. The number of antennas in the antenna array is not limited to four, but may be any number suitable for the functions to be performed by embodiments of the invention.

The prover device 100 and/or the verifier device 102 may be, for example, a miniature device such as a key fob, smart card, jewelry, ceiling beacon, or the like. The prover device 100 and/or the verifier device 102 may be, for example, larger device such as a cell phone, smart phone, flip-phone, PDA, graphic pad, ceiling beacon, or even larger devices such as a laptop computer, desktop computer, kitchen appliance, such as a refrigerator, an automobile dashboard, and the like. However, in embodiments, the relative sizes of devices 100 and 102 may be arbitrary, either one of the devices may be either mobile or fixed-base, and the verifier device 102 may have either a single antenna or an antenna array.

FIG. 1D illustrates an example embodiment of the invention shown in FIGS. 1A, 1B, and 1C, wherein the wherein the prover device 100 is a key fob that transmits angle of departure (AoD) packets 160 to the verifier device 102 that is a mobile wireless telephone that has two antennas A1 and A2 separated by a known distance "a", to perform angle of departure (AoD) estimation of the distance between the two wireless devices 100 and 102, the verifier device 102 determining a first angle of departure $\theta_1$ using the first antenna A1 and determining the second angle of departure $\theta_2$ using the second antenna A2, the first antenna A1 being spatially separate from the second antenna A2, in accordance with at least one embodiment of the present invention.

FIG. 1E illustrates an example embodiment of the invention, wherein examples of removable storage media 126'/127' are shown, based on magnetic, electronic and/or optical technologies, such as magnetic disks, optical disks, semiconductor memory circuit devices, and micro-SD memory cards, for storing data and/or computer program code as an example computer program product, in accordance with at least one embodiment of the present invention.

Figure 2A:
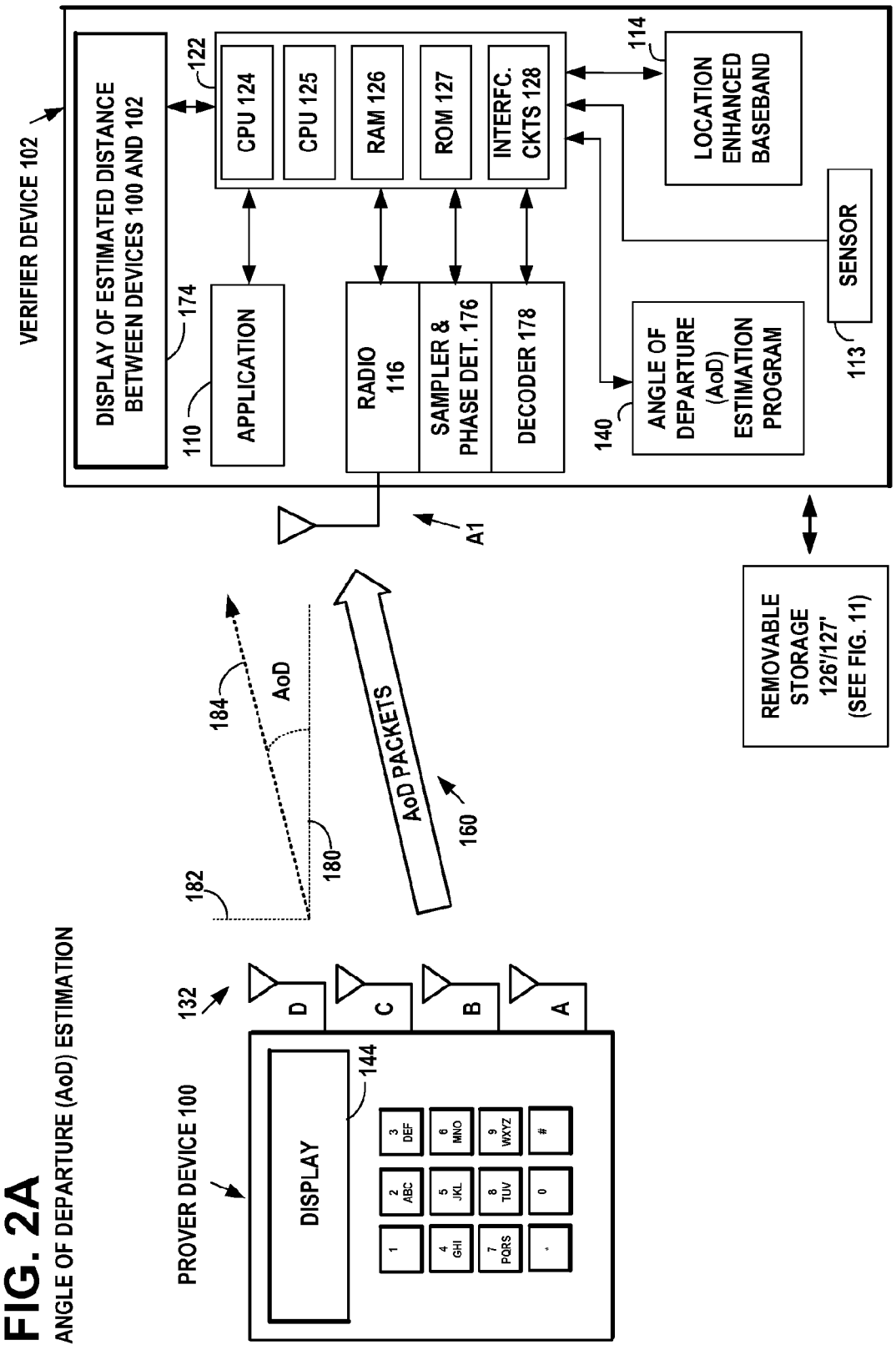
FIG. 2A illustrates an example embodiment of the invention, depicting an example network diagram showing angle of departure (AoD) estimation being used to estimate a distance between wireless devices, wherein a prover device transmits angle of departure packets to a verifier device that has single antenna, the verifier device determining the first angle of departure when the device receives the angle of departure packets at a first location and determining the second angle of departure when the device receives the angle of departure packets at a second location, the first location being spatially separate from the second location, in accordance with at least one embodiment of the present invention.

2. Secure Distance Bounding Using AoD Measurements and an Acceleration Sensor in the Verifier FIG. 2A illustrates an example embodiment of the invention, depicting an example network diagram showing angle of departure (AoD) estimation being used to estimate a distance between wireless devices, wherein a prover device 100 transmits angle of departure packets 160 to a verifier device 102 that has single antenna A1, the verifier device 102 determining the first angle of departure $\theta_1$ when the device receives the angle of departure (AoD) packets 160 at a first location V at time t=t1 in FIG. 2B and determining the second angle $\theta_2$ of departure when the device receives the angle of departure (AoD) packets 160 at a second location V' at time t=t2 in FIG. 2C, the first location V being spatially separate from the second location V', in accordance with at least one embodiment of the present invention. The verifier device 102 generates distance estimation data based on the determined first angle of departure $\theta_1$ and second angle of departure $\theta_2$, wherein the verifier device 102 has a single antenna A1, in accordance with at least one embodiment of the present invention.

In example embodiments of the invention, the verifier 102 has one antenna and is capable for receiving the angle of departure (AoD) packets 160 transmitted by the prover P (100). Based on the received packets the verifier device 102 may compute direction $\theta_1$ at location V at time instant t1 as shown in FIG. 2B.

Figure 2B:
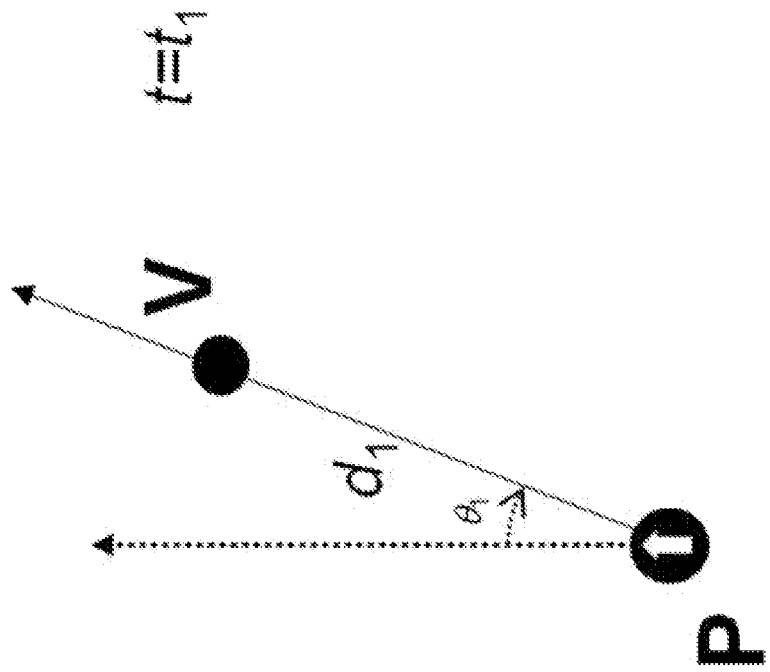
FIG. 2B illustrates an example embodiment of the invention, depicting a determination by the verifier device of a first angle of departure at a first location, in accordance with at least one embodiment of the present invention.
Figure 2C:
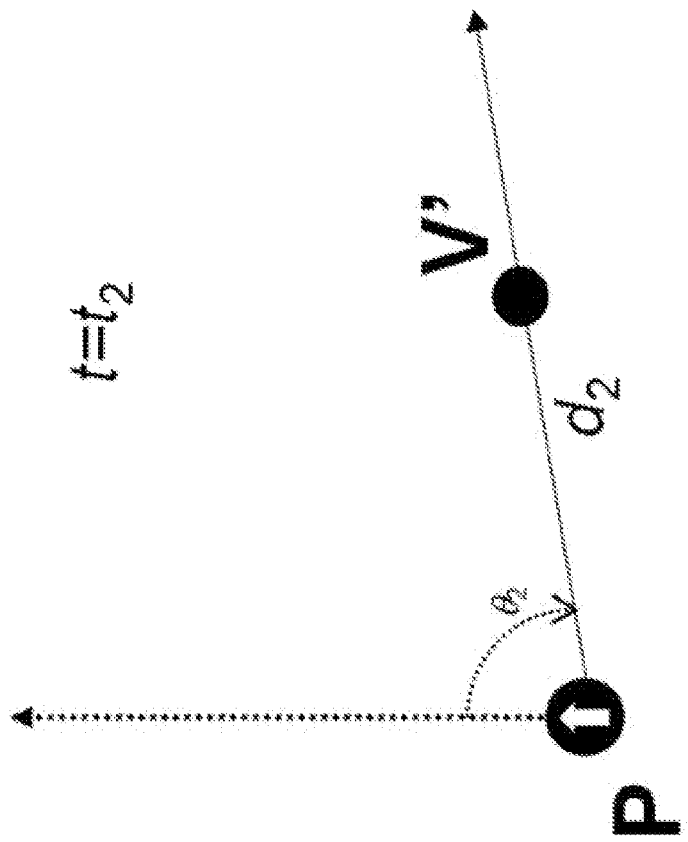
FIG. 2C illustrates an example embodiment of the invention, depicting a determination by the verifier device of a second angle of departure at a second location sent from the prover device and a generation of distance estimation data based on the determined first angle of departure and second angle of departure, wherein the verifier device that has a single antenna, in accordance with at least one embodiment of the present invention.

In example embodiments of the invention, during the verification process the user may be prompted by the verifier device 102 to move the verifier device 102 from the first location V in FIG. 2B to a new location V' so that the measured direction becomes $\theta_2$ at time instant t2, as shown in FIG. 2C. Thus, the verifier 102 is capable of calculating the angle difference $\alpha = \theta_2 - \theta_1$, as in the previous method described in section A1.

In example embodiments of the invention, provided that the verifier 102 also has an acceleration sensor 113, it may compute the distance s(t) between the two locations V and V' by integrating the acceleration a(t) over time to obtain the velocity v(t) and then integrating the velocity over time to obtain the distance s(t), between the limits t1 and t2:

$$v(t) = \int_{t_1}^{t_2} a(t') dt' + v_1$$

$$s(t) = \int_{t_1}^{t_2} v(t') dt' + s_1$$

While the above example embodiments are described for antenna arrays of one dimension, the embodiments may be readily expanded to antenna arrays of three dimensions using vector representations instead of scalars. In practice any rotation of the verifier may be taken into account by using a gyroscope sensor with the acceleration sensor 113, when using the values from the acceleration sensor 113. The distance between V and V' may then be used in a similar manner as described in section A1, above.

FIG. 3B illustrates an example embodiment of the invention, depicting an example of angle of departure (AoD) estimation, showing an example network diagram illustrating a relative location along a first axis 180 of the prover device 100 and the verifier device 102. In embodiments of the invention, the prover device 100 transmits the reference data stream 200, the verifier device 102 receives the reference data stream and it decodes the reference data stream to obtain a direction value, in accordance with at least one embodiment of the present invention.

In example embodiments of the invention, the normal axis 180 perpendicular to the antenna array 132 of the prover device 100, intersects the verifier device 102. In the arrangement of the devices 100 and 102 in FIG. 3B, the angle of departure (AoD) is zero degrees. FIG. 3B shows the resulting relationship of the phases 202' for the 2-bit portions of the direction estimation data 169 in the reference data stream 200 as they are received at the verifier device 102, when compared with the phases 202 for the 2-bit portions of the direction estimation data 169 as they were sequentially transmitted by the four antennas A, B, C, and D at the prover device 100, accordance with at least one embodiment of the present invention. In the example of FIG. 3B, the relationship determined by the sampler and phase detector 176 and decoder 178 between the phases 202' for the 2-bit portions of the direction estimation data 169 in the reference data stream 200 as they are received at the verifier device 102, is substantially the same as the relationship between the phases 202 for the 2-bit portions of the direction estimation data 169 as they were sequentially transmitted by the four antennas A, B, C, and D at the prover device 100. Based on this determination by the sampler and phase detector 176 and decoder 178, the estimated angle of departure (AoD) is zero degrees.

FIG. 3C illustrates an example embodiment of the invention, depicting for an example of angle of departure (AoD) estimation, showing an example network diagram illustrating a second relative location along a second axis 184 offset from the first axis 180, of the prover device 100 and the verifier device 102. In embodiments of the invention, the prover device 100 transmits reference data stream 200, the verifier device 102 receives the reference data stream and it decodes the reference data stream to obtain a direction value, in accordance with at least one embodiment of the present invention.

In example embodiments of the invention, a second relative location along a second axis 184 is offset from the normal axis 180, of the prover device 100 and the verifier device 102. In the arrangement of the devices 100 and 102 in FIG. 3C, the angle of departure (AoD) is, for example, thirty degrees. FIG. 3C shows the resulting relationship of the phases 202" for the 2-bit portions of the direction estimation data 169 in the reference data stream 200 as they are received at the verifier device 102, when compared with the phases 202 for the 2-bit portions of the direction estimation data 169 as they were sequentially transmitted in the second transmitting interval by the four antennas A, B, C, and D at the prover device 100, in accordance with at least one embodiment of the present invention. In the example embodiment of FIG. 3C, the relationship determined by the sampler and phase detector 176 and decoder 178 between the phases 202" for the 2-bit portions of the direction estimation data 169 in the reference data stream 200 as they are received at the verifier device 102, shows that their phases are shifted in time of arrival with respect to the relationship between the phases 202 for the 2-bit portions of the direction estimation data 169 as they were sequentially transmitted by the four antennas A, B, C, and D at the prover device 100. The phase shift, in this example embodiment, is due to the change in the propagation distance between the individual elements of the antenna array 132 at the prover device 100 and the antenna 170 at the verifier device 102. In the example embodiment of FIG. 3C, the relationship determined by the sampler and phase detector 176 and decoder 178 between the phases 202" at the verifier device 102 and the phases 202 at the prover device 100, results in an estimated angle of departure (AoD) of thirty degrees.

FIG. 4 illustrates an example embodiment of the invention, depicting an example of angle of departure (AoD) estimation in a flow diagram 320 of an example method, from the point of view of the verifier device 102, in accordance with at least one embodiment of the present invention. The steps of the flow diagram represent computer code instructions stored in the RAM and/or ROM memory of the verifier device 102, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 322: receiving, by an apparatus from a remote device, one or more wireless packets including information packets containing angle of departure information of the remote device;

Step 324: determining in the apparatus, a first angle of departure and a second angle of departure from the received angle of departure information; and Step 326: generating distance estimation data in the apparatus relative to the remote device, based on the determined first angle of departure and second angle of departure.

B. Examples of Angle of Arrival (AoA) Estimation

The term "angle of arrival (AoA)", as used herein, is employed with reference to an array of antennas arranged with a normal axis. For a linear antenna array along a linear axis, a normal axis perpendicular to the linear axis defines a plane with the linear antenna array. The apparent direction of reception of a signal by the linear antenna array, as seen from a remote transmitting device occupying the plane, may be represented by an observation vector. The angle between the observation vector and the normal axis is defined as the angle of arrival (AoA) of the signal as it approaches the antenna array. In embodiments, the antenna array may be arranged in a two-dimensional array in a plane and the normal axis is perpendicular to the plane of the antenna array. In this arrangement, the angle of arrival (AoA) is similarly defined as the angle between the observation vector and the normal axis to the plane. In embodiments, the antenna array may be arranged in any arbitrary manner, either in a linear array, a two-dimensional array, or a three dimensional array.

1. Secure Distance Bounding Using AoA Measurements and Two Antennas in the Verifier FIG. 5A illustrates an example embodiment of the invention, depicting an example of angle of arrival (AoA) estimation, showing an example network diagram of a prover device 102' having a single antenna 170 transmitting angle of arrival packets 160B to a verifier device 100', the verifier device 100' determining a first angle of arrival $\theta_1$ using a first antenna array A1 and determining a second angle of arrival $\theta_2$ using a second antenna array A2, the first antenna array A1 being spatially separate from the second antenna array A2 by a distance "a", in accordance with at least one embodiment of the present invention. The first antenna array A1 is composed of antennas A and B and the second antenna array A2 is composed of antennas C and D. Array A1 may have more than two antennas and array A2 may have more than two antennas.

In example embodiments of the invention, the prover device 102' transmits the angle of arrival packet 160B, that may include an indication "Direction Type" that is used to inform the receiving, verifier device 100' about the existence and properties of the angle of arrival packet 160B.

In example embodiments of the invention, the angle of arrival packet 160B may include an indication whether the information relates to angle-of-arrival (AoA) information, angle-of-departure (AoD) positioning information, or both types. The angle of arrival packet 160B may include a reference binary bit pattern, such as "1111000", shown in FIG. 7A. FIG. 7A illustrates an example of how the bits in the reference pattern from the angle of arrival packet 160B are transmitted by the single antenna 170 at the prover device 102' and received by the first and second antenna arrays A1 and A2 and sampled at the verifier device 100', in accordance with at least one embodiment of the present invention.

In example embodiments of the invention, the angle of arrival packet 160B may include a data and length field, that includes data such as coding, length of the direction estimation data, and other factors useful in enabling the verifier device 102' to estimate a direction. The angle of arrival packet 160B may also include direction estimation data that may comprise several concatenated segments of the binary bit pattern. In embodiments of the invention, the prover device 102' transmits the angle of arrival packet 160B from the antenna 170. The direction estimation data is transmitted as a reference data stream 200', as shown in FIG. 7B.

In example embodiments of the invention, the verifier device 100' may receive the angle of arrival packet 160B. The reference data stream 200' transmission from the prover device 102' is received by the two antenna arrays A1 and A2 at the verifier device 100', each antenna array A1 and A2 sequentially switching the reference bits of the direction estimation data in the data stream 200' during their reception. The angle of arrival (AoA) estimation is made by sampling the phase and amplitude of the reference bits of the direction estimation data. The verifier device 102' includes a sampler and phase detector 176B, a decoder 178B, and an angle of arrival (AoA) estimation program 140B to estimate the angle of arrival (AoA) of the reference data stream 200', based on the angle of arrival packet 160B received from the prover device 102'.

The verifier device 100' of FIG. 5A includes processor 122 that may access random access memory RAM 126 and/or read only memory ROM 127 in order to obtain stored program code and data for use during processing. RAM 126 or ROM 127 may generally include removable or imbedded memories that operate in a static or dynamic mode. Further, RAM 126 or ROM 127 may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 126'/127' and in FIG. 1E, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

FIG. 5B illustrates an example embodiment of the invention, depicting the example network diagram of FIG. 5A, showing more details of the prover device 102', in accordance with at least one embodiment of the present invention.

The prover device 102' of FIG. 5B includes processor 122 that may access random access memory RAM 126 and/or read only memory ROM 127 in order to obtain stored program code and data for use during processing. RAM 126 or ROM 127 may generally include removable or imbedded memories that operate in a static or dynamic mode. Further, RAM 126 or ROM 127 may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 126'/127' and in FIG. 1E, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

FIG. 5C illustrates an example embodiment of the invention, depicting a determination by the verifier device of a first angle of arrival $\theta_1$ and a second angle of arrival $\theta_2$ sent from the prover device and a generation of distance estimation data based on the determined first angle of arrival $\theta_1$ and second angle of arrival $\theta_2$, wherein the verifier device that has two antenna arrays separated by a known distance "a", in accordance with at least one embodiment of the present invention.

In example embodiments of the invention, the verifier device 100' is equipped with two in-built antenna arrays A1 and A2 physically fixed at a known distance "a" from each other. Each antenna array is separately capable of receiving the angle of arrival (AoA) packets 160B transmitted by the prover device 102', using a switched antenna protocol.

In example embodiments of the invention, based on the received angle of arrival (AoA) packets 160B, the verifier 100' may compute two directions $\theta_1$ and $\theta_2$ as shown in FIG. 5C.

In example embodiments of the invention, the distances d1 and d2 may now be defined using the law of sines:

$$d_1 = \frac{a\cos(\theta_2)}{\sin(\theta_1 - \theta_2)}$$

$$d_2 = \frac{a\cos(\theta_1)}{\sin(\theta_1 - \theta_2)}$$

FIG. 5D illustrates an example embodiment of the invention shown in FIGS. 5A, 5B, and 5C, wherein the prover device 102' is a key fob that transmits angle of arrival (AoA) packets 160B to the verifier device 100' that is a mobile wireless telephone, the verifier device 100' determining a first angle of arrival $\theta_1$ using a first antenna array A1 and determining a second angle of arrival $\theta_2$ using a second antenna array A2, the first antenna array A1 being spatially separate from the second antenna array A2 by a distance "a", in accordance with at least one embodiment of the present invention.

2. Secure Distance Bounding Using AoA Measurements and an Acceleration Sensor in the Verifier FIG. 6A illustrates an example embodiment of the invention, depicting an example of angle of arrival (AoA) estimation, showing an example network diagram of a prover device 102' having a single antenna 170 transmitting angle of arrival packets 160B to a verifier device 100', the verifier device 100' determining a first angle of arrival $\theta_1$ when the verifier device 100' receives the angle of arrival packets 160B at a first location V in FIG. 6B and determining a second angle of arrival $\theta_2$ when the verifier device 100' receives the angle of arrival packets 160B at a second location V' in FIG. 6C, the first location V being spatially separate from the second location V', in accordance with at least one embodiment of the present invention.

In example embodiments of the invention, the verifier device 100' may be equipped with one in-built antenna array A1 in FIG. 6A and is capable of receiving the angle of arrival packets 160B transmitted by the Prover P (102'). Based on the received packets the Verifier device 100' may compute direction $\theta_1$ at location V at time instant t1 as shown in FIG. 6B.

In example embodiments of the invention, during the verification process the user may be asked to move the Verifier device 102' from location V to a new location V' so that the measured direction becomes $\theta_2$ at location V' at time instant t2 as shown in FIG. 6C.

In example embodiments of the invention, provided that the verifier device 100' has an acceleration sensor 113, it may compute the distance between the two locations V and V' by integrating the acceleration twice over time, as previously described in section 1b. In example embodiments of the invention, based on the known movement distance, the verifier device 100' may compute the distances d1 and d2 as shown previously in section A2.

FIG. 7B illustrates an example embodiment of the invention, depicting an example of angle of arrival (AoA) estimation, shows an example network diagram illustrating a relative location along a first axis 180 of the prover device 102' and the verifier device 100'. In embodiments of the invention, the prover device 102' transmits the reference data stream 200'. The reference data stream transmission from the prover device 102' is received by the two antenna arrays A1 and A2 at the verifier device 100', each of the two antenna arrays sequentially switching the reference bits in the data stream 200' during their reception. The verifier device 100' receives the reference data stream and decodes the reference data stream to obtain a direction value, in accordance with at least one embodiment of the present invention.

In example embodiments of the invention, the prover device 102' transmits the reference data stream 200'. The reference data stream 200' of bits in the direction estimation data 169B transmitted from the prover device 102' is received by the antenna arrays A1 and A2 at the verifier device 100', each of the two antenna arrays sequentially switching the reference bits of direction estimation data 169B in the data stream 200' during their reception. The verifier device 100' receives the reference data stream 200' and decodes the reference data stream 200' to obtain a direction value, based on the angle of arrival packet 160B, in accordance with at least one embodiment of the present invention.

FIG. 7C illustrates an example embodiment of the invention, depicting an example of angle of arrival (AoA) estimation, showing an example network diagram illustrating a second relative location along a second axis 184 offset from the first axis 180, of the prover device 102' and the verifier device 100'. In embodiments of the invention, the prover device 102' transmits the reference data stream 200'. The reference data stream transmission from the prover device 102' is received by the antenna arrays A1 and A2 at the verifier device 100', each of the two antenna arrays sequentially switching the reference bits in the data stream during their reception. The verifier device receives the reference data stream and decodes the reference data stream to obtain a direction value, in accordance with at least one embodiment of the present invention.

In example embodiments of the invention, the prover device 102' transmits the reference data stream 200' of bits in the direction estimation data 169B. The reference data stream 200' transmitted from the prover device 102' is received by the antenna arrays A1 and A2 at the verifier device 100', each of the two antenna arrays sequentially switching the reference bits of direction estimation data 169B in the data stream 200' during their reception. The verifier device 100' receives the reference data stream 200' and decodes the reference data stream 200' to obtain a direction value, based on the angle of arrival packet 160B, in accordance with at least one embodiment of the present invention.

FIG. 8 illustrates an example embodiment of the invention, depicting an example of angle of arrival (AoA) estimation, an example flow diagram 620 of an example method, from the point of view of the verifier device 100', in accordance with at least one embodiment of the present invention. The steps of the flow diagram represent computer code instructions stored in the RAM and/or ROM memory of the verifier device 100', which when executed by the central processing units (CPU) 124 and/or 125, carry out the functions of the example embodiments of the invention. The steps may be carried out in another order than shown and individual steps may be combined or separated into component steps. The flow diagram has the following steps:

Step 622: receiving, by an apparatus from a remote device, one or more wireless packets including information packets containing angle of arrival information from the remote device;

Step 624: determining in the apparatus, a first angle of arrival and a second angle of arrival from the received angle of arrival information; and Step 626: generating distance estimation data in the apparatus relative to the remote device, based on the determined first angle of arrival and second angle of arrival.

FIG. 9 illustrates a network of ceiling beacons that incorporate angle of departure (AoD) estimation to estimate a distance between wireless devices. A prover device 100 in a ceiling beacon transmits angle of departure (AoD) packets 160 to a verifier device 102 in a mobile communications device that has two antennas A1 and A2 separated by a known distance "a". The verifier device 102 determines a first angle of departure using the first antenna A1 and determines a second angle of departure using a second antenna A2, the first antenna A1 being spatially separate from the second antenna A2, in accordance with at least one embodiment of the present invention.

In example embodiments of the invention, the verifier device 102 of FIG. 1A is held by a user standing on a floor 900 beneath the ceiling 902 in a room or corridor within a building. An array of prover devices 100 of FIG. 1A is mounted as ceiling beacons on or within the ceiling 902 above the floor. In example embodiments of the invention, each prover device 100 may be located in a known position in the ceiling 902. One or more of the prover devices 100 are transmitting angle of departure (AoD) packets 160.

The verifier device 102 receives the angle of departure packets 160 and estimates the first angle of departure $\theta_1$ using the first antenna A1 and estimates the second angle of departure $\theta_2$ using the second antenna A2 separated by a known distance "a". The verifier device 102 generates distance estimation data based on the determined first angle of departure $\theta_1$ and second angle of departure $\theta_2$, wherein the verifier device has two antennas A1 and A2 separated by a known distance "a", in accordance with at least one embodiment of the present invention. By setting a minimum requirement for the difference $\alpha$ between these two angles ($\alpha=\theta_2-\theta_1$), a maximum value may be defined for the distances d1 and d2, respectively between the antenna A1 and the prover device and between the antenna A2 and the prover device: The distance data generated by the verifier device 102 may be used by the verifier device to verify that the prover device 100 is genuine. Proving the proximity of the prover device 100 may be an important consideration in navigation by the user exploring with the aid of the verifier device 102. In secure distance estimation or bounding, the prover device 100 may need to prove its distance from the verifier device 102 and the verifier device 102 may attempt to verify the location of the prover device 100.

The prover device 100 and the verifier device 102 of FIG. 9 may include removable or imbedded memories that operate in a static or dynamic mode. The prover device 100 and the verifier device 102 of FIG. 9 may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 126'/127' and in FIG. 1E, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

FIG. 10A illustrates a network of ceiling beacons that incorporate angle of arrival (AoA) estimation, showing an example network diagram of a prover device 102' in a mobile communications device having a single antenna transmitting angle of arrival packets 160B to a verifier device 100' in a ceiling beacon, the verifier device 100' determining a first angle of arrival $\theta_1$ using a first antenna array A1 and determining a second angle of arrival $\theta_2$ using a second antenna array A2, the first antenna array A1 being spatially separate from the second antenna array A2 by a distance "a", in accordance with at least one embodiment of the present invention. In the verifier device 100' in the ceiling beacon, the first antenna array A1 is composed of antennas A and B and the second antenna array A2 is composed of antennas C and D. In example embodiments of the invention, array A1 may have more than two antennas and array A2 may have more than two antennas.

In example embodiments of the invention, the prover device 102' of FIG. 5A is held by a user standing on a floor 900 beneath the ceiling 902 in a room or corridor within a building. An array of verifier devices 100' of FIG. 5A are mounted as ceiling beacons on or within the ceiling 902 above the floor.

In example embodiments of the invention, each verifier device 100' in a ceiling beacon within range of the prover device 102' held by the user, may determine a first angle of arrival $\theta_1$ and a second angle of arrival $\theta_2$ of angle of arrival packets 160B sent from the prover device 102'. In example embodiments of the invention, each verifier device 100' may generate distance estimation data based on the determined first angle of arrival $\theta_1$ and second angle of arrival $\theta_2$.

In example embodiments of the invention, each of the verifier devices 100' in the ceiling beacons, may send its distance estimation data to the buffer 1012 and CPU 1016 for a computation by triangulation, of the two dimensional or three dimensional location of the prover device 102' held by the user. The computed location of the prover device 102' held by the user may be used for security monitoring or surveillance purposes.

FIG. 10B illustrates an example embodiment of the invention, wherein the network of ceiling beacons incorporate angle of arrival (AoA) estimation, as shown in FIG. 10A. In an example embodiment of the invention, the two dimensional or three dimensional location of the prover device 102' held by the user, as computed by the CPU 1016, may be fed back to the prover device 102' held by the user, for purposes, such as displaying navigational information.

The verifier device 100' and the prover device 102' of FIGS. 10A and 10B may include removable or imbedded memories that operate in a static or dynamic mode. The verifier device 100' and the prover device 102' of FIGS. 10A and 10B may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 126'/127' and in FIG. 1E, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

FIG. 11A illustrates an example embodiment of the invention, depicting secure distance bounding using AoD measurements, with an antenna array in the prover and two antennas in the verifier, in accordance with at least one embodiment of the present invention. An example real world use case may be opening a door with a "Find & Do" phone. Example steps to carry out the secure distance bounding process include the steps shown in FIG. 11A.

FIG. 11B illustrates an example embodiment of the invention, depicting secure distance bounding using AoD measurements, with an antenna array in the verifier, two antennas in the prover, in accordance with at least one embodiment of the present invention. An example real world use case may be opening a door with a dual-antenna Bluetooth LE tag. Example steps to carry out the secure distance bounding process include the steps shown in FIG. 11B.

FIG. 12A illustrates an example embodiment of the invention, depicting secure distance bounding using AoD measurements, with an antenna array in the prover and an acceleration sensor in the verifier, in accordance with at least one embodiment of the present invention. An example real world use case may be identification of a large object, e.g. a container. Process can be repeated until the verifier has moved through a pre-defined path. Example steps to carry out the secure distance bounding process include the steps shown in FIG. 12A.

FIG. 12B illustrates an example embodiment of the invention, depicting secure distance bounding using AoD measurements, with an antenna array in the verifier and an acceleration sensor in the prover, in accordance with at least one embodiment of the present invention. Process can be repeated until the prover has moved through a pre-defined path. An example real world use case may be opening a door with a dual-antenna Bluetooth LE tag. Example steps to carry out the secure distance bounding process include the steps shown in FIG. 12B.

FIG. 13A illustrates an example embodiment of the invention, depicting secure distance bounding using AoD measurements, with two antenna arrays in the verifier, in accordance with at least one embodiment of the present invention. An example real world use case may be opening a door with a Bluetooth LE tag or secure localization of a mobile phone. Example steps to carry out the secure distance bounding process include the steps shown in FIG. 13A.

FIG. 13B illustrates an example embodiment of the invention, depicting secure distance bounding using AoD measurements, with two antenna arrays in the prover, in accordance with at least one embodiment of the present invention. An example real world use case may be secure identification of a location. Example steps to carry out the secure distance bounding process include the steps shown in FIG. 13B.

FIG. 14A illustrates an example embodiment of the invention, depicting secure distance bounding using AoD measurements, with an antenna array and an acceleration sensor in the verifier, in accordance with at least one embodiment of the present invention. An example real world use case may be identification of an object with a "Find&Do" phone. Process can be repeated until the verifier has moved through a pre-defined path. Example steps to carry out the secure distance bounding process include the steps shown in FIG. 14A.

FIG. 14B illustrates an example embodiment of the invention, depicting secure distance bounding using AoD measurements, with an antenna array and an acceleration sensor in the prover, in accordance with at least one embodiment of the present invention. An example real world use case may be opening a door with a "Find&Do" phone. Process can be repeated until the prover has moved through a pre-defined path. Example steps to carry out the secure distance bounding process include the steps shown in FIG. 14B.

FIG. 15A illustrates an example embodiment of the invention, depicting secure distance bounding using AoD measurements, with two antenna arrays in the verifier and two antennas in the prover, in accordance with at least one embodiment of the present invention. An example real world use case may be opening a car door with a dual-antenna Bluetooth LE tag. Example steps to carry out the secure distance bounding process include the steps shown in FIG. 15A.

FIG. 15B illustrates an example embodiment of the invention, depicting secure distance bounding using AoD measurements, with two antenna arrays in the prover and two antennas in the verifier, in accordance with at least one embodiment of the present invention. An example real world use case may be identification of a large object, e.g. a container. Example steps to carry out the secure distance bounding process include the steps shown in FIG. 15B.

FIG. 16 illustrates an example embodiment of the invention, depicting secure distance bounding using combined AoD and AoA measurements, with two antenna arrays in the verifier and one antenna array in the prover, in accordance with at least one embodiment of the present invention. An example real world use case may be opening a locked door. Example steps to carry out the secure distance bounding process include the steps shown in FIG. 16.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable non-transient medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
receiving, by an apparatus from a remote device, one or more wireless packets including information packets containing angle of departure information of the remote device;
sampling and decoding, by the apparatus, a reference data stream of direction estimation data in the received angle of departure information, the sampling and decoding performed for first and second locations separated by a separation distance;
determining in the apparatus, a first angle of departure and a second angle of departure from the received angle of departure information, based on the sampling and decoding performed for the first and second locations; and
generating distance estimation data in the apparatus relative to the remote device, based on a difference between the first angle of departure and second angle of departure, and on the separation distance.

2. The method of claim 1, further comprising:
determining the first angle of departure using a first antenna of the apparatus receiving the information packets and determining the second angle of departure using a second antenna of the apparatus receiving the information packets, the first antenna being spatially separate from the second antenna.

3. The method of claim 1, further comprising:
determining the first angle of departure when the apparatus receives the information packets at a first location and determining the second angle of departure when the apparatus receives the information packets at a second location, the first location being spatially separate from the second location.

4. The method of claim 1, further comprising:
determining the first angle of departure when the apparatus receives the information packets at a first location and determining the second angle of departure when the apparatus receives the information packets at a second location, the first location being spatially separate from the second location by a separation distance that is measured with an acceleration sensor.

5. The method of claim 1, further comprising:
calculating the distance estimation data based on a difference between the first angle of departure and second angle of departure.

6. An apparatus, comprising:
at least one processor;
at least one memory including computer program code;
the at least one memory and the computer program code configured to, with the at least one processor, cause the apparatus at least to:
receive from a remote device, one or more wireless packets including information packets containing angle of departure information of the remote device;
sample and decode a reference data stream of direction estimation data in the received angle of departure information, the sampling and decoding performed for first and second locations separated by a separation distance;
determine a first angle of departure and a second angle of departure from the received angle of departure information, based on the sampling and decoding performed for the first and second locations; and
generate distance estimation data relative to the remote device, based on a difference between the first angle of departure and second angle of departure, and on the separation distance.

7. The apparatus of claim 6, further comprising:
the at least one memory and the computer program code configured to, with the at least one processor, cause the apparatus at least to:
determine the first angle of departure using a first antenna of the apparatus receiving the information packets and determine the second angle of departure using a second antenna of the apparatus receiving the information packets, the first antenna being spatially separate from the second antenna.

8. The apparatus of claim 6, further comprising:
the at least one memory and the computer program code configured to, with the at least one processor, cause the apparatus at least to:
determine the first angle of departure when the apparatus receives the information packets at a first location and determine the second angle of departure when the apparatus receives the information packets at a second location, the first location being spatially separate from the second location.

9. The apparatus of claim 6, further comprising:
the at least one memory and the computer program code configured to, with the at least one processor, cause the apparatus at least to:
determine the first angle of departure when the apparatus receives the information packets at a first location and determine the second angle of departure when the apparatus receives the information packets at a second location, the first location being spatially separate from the second location by a separation distance that is measured with an acceleration sensor.

10. The apparatus of claim 6, further comprising:
the at least one memory and the computer program code configured to, with the at least one processor, cause the apparatus at least to:
calculate the distance estimation data based on a difference between the first angle of departure and second angle of departure.

11. A non-transitory computer-readable storage medium readable in which computer executable program code is stored, the computer executable program code causing the apparatus to perform the following when executed by the processor:
  receiving, by an apparatus from a remote device, one or more wireless packets including information packets containing angle of departure information of the remote device;
  sampling and decoding, by the apparatus, a reference data stream of direction estimation data in the received angle of departure information, the sampling and decoding performed for first and second locations separated by a separation distance;
  determining in the apparatus, a first angle of departure and a second angle of departure from the received angle of departure information, based on the sampling and decoding performed for the first and second locations; and
  generating distance estimation data in the apparatus relative to the remote device, based on a difference between the first angle of departure and second angle of departure, and on the separation distance.

12. A method comprising:
  receiving, by an apparatus from a remote device, one or more wireless packets including information packets containing angle of arrival information from the remote device;
  sampling and decoding, by the apparatus, a reference data stream of direction estimation data in the received angle of arrival information, the sampling and decoding performed for first and second locations separated by a separation distance;
  determining in the apparatus, a first angle of arrival and a second angle of arrival from the received angle of arrival information, based on the sampling and decoding performed for the first and second locations; and
  generating distance estimation data in the apparatus relative to the remote device, based on a difference between the first angle of arrival and second angle of arrival, and on the separation distance.

13. The method of claim 12, further comprising:
  determining the first angle of arrival using a first antenna array of the apparatus receiving the information packets and determining the second angle of arrival using a second antenna array of the apparatus receiving the information packets, the first antenna array being spatially separate from the second antenna array.

14. The method of claim 12, further comprising:
  determining the first angle of arrival when the apparatus receives the information packets in an antenna array of the apparatus when the apparatus is at a first location and determining the second angle of arrival when the apparatus receives the information packets in the antenna array when the apparatus is at a second location, the first location being spatially separate from the second location.

15. The method of claim 12, further comprising:
  determining the first angle of arrival when the apparatus receives the information packets in an antenna array of the apparatus when the apparatus is at a first location and determining the second angle of arrival when the apparatus receives the information packets in the antenna array when the apparatus is at a second location, the first location being spatially separate from the second location, the first location being spatially separate from the second location by a separation distance that is measured with an acceleration sensor.

16. The method of claim 12, further comprising:
  calculating the distance estimation data based on a difference between the first angle of arrival and second angle of arrival.

17. An apparatus, comprising:
  at least one processor;
  at least one memory including computer program code;
  the at least one memory and the computer program code configured to, with the at least one processor, cause the apparatus at least to:
  receive from a remote device, one or more wireless packets including information packets containing angle of arrival information from the remote device;
  sample and decode a reference data stream of direction estimation data in the received angle of arrival information, the sampling and decoding performed for first and second locations separated by a separation distance;
  determine a first angle of arrival and a second angle of arrival from the received angle of arrival information, based on the sampling and decoding performed for the first and second locations; and
  generate distance estimation data relative to the remote device, based on a difference between the first angle of arrival and second angle of arrival, and on the separation distance.

18. The apparatus of claim 17, further comprising:
  determine the first angle of arrival using a first antenna array of the apparatus receiving the information packets and determine the second angle of arrival using a second antenna array of the apparatus receiving the information packets, the first antenna array being spatially separate from the second antenna array.

19. The apparatus of claim 17, further comprising:
  determine the first angle of arrival when the apparatus receives the information packets in an antenna array of the apparatus when the apparatus is at a first location and determine the second angle of arrival when the apparatus receives the information packets in the antenna array when the apparatus is at a second location, the first location being spatially separate from the second location.

20. The apparatus of claim 17, further comprising:
  determine the first angle of arrival when the apparatus receives the information packets in an antenna array of the apparatus when the apparatus is at a first location and determine the second angle of arrival when the apparatus receives the information packets in the antenna array when the apparatus is at a second location, the first location being spatially separate from the second location, the first location being spatially separate from the second location by a separation distance that is measured with an acceleration sensor.

21. The apparatus of claim 17, further comprising:
  calculate the distance estimation data based on a difference between the first angle of arrival and second angle of arrival.

22. A non-transitory computer-readable storage medium readable in which computer executable program code is stored, the computer executable program code causing the apparatus to perform the following when executed by the processor:

receiving, by an apparatus from a remote device, one or more wireless packets including information packets containing angle of arrival information from the remote device;

sampling and decoding, by the apparatus, a reference data stream of direction estimation data in the received angle of arrival information, the sampling and decoding performed for first and second locations separated by a separation distance;

determining in the apparatus, a first angle of arrival and a second angle of arrival from the received angle of arrival information, based on the sampling and decoding performed for the first and second locations; and generating distance estimation data in the apparatus relative to the remote device, based on a difference between the first angle of arrival and second angle of arrival, and on the separation distance.

* * * * *